US009355384B2

(12) United States Patent
Victor

(10) Patent No.: US 9,355,384 B2
(45) Date of Patent: May 31, 2016

(54) PROVIDING ACCESS TO DOCUMENTS REQUIRING A NON-DISCLOSURE AGREEMENT (NDA) IN AN ONLINE DOCUMENT SHARING COMMUNITY

(76) Inventor: David W. Victor, Los Angeles, CA (US)

(*) Notice: Subject to any disclaimer, the term of this patent is extended or adjusted under 35 U.S.C. 154(b) by 95 days.

(21) Appl. No.: 13/424,117

(22) Filed: Mar. 19, 2012

(65) Prior Publication Data

US 2013/0247221 A1    Sep. 19, 2013

(51) Int. Cl.
*H04L 29/06* (2006.01)
*G06Q 10/10* (2012.01)

(52) U.S. Cl.
CPC .............. *G06Q 10/103* (2013.01); *H04L 63/10* (2013.01)

(58) Field of Classification Search
USPC ................................................. 705/51; 726/2
See application file for complete search history.

(56) References Cited

U.S. PATENT DOCUMENTS

| | | | |
|---|---|---|---|
| 6,549,894 B1 | 4/2003 | Simpson et al. |
| 7,330,981 B2 | 2/2008 | Willman |
| 7,584,250 B1 | 9/2009 | Chapman et al. |
| 7,810,027 B2 | 10/2010 | Bendik |
| 7,987,295 B2 | 7/2011 | Tanaka |
| 7,996,882 B2 | 8/2011 | L'Heureux et al. |
| 8,032,569 B2 | 10/2011 | Oshita et al. |
| 8,073,839 B2 | 12/2011 | Rathod |
| 8,099,433 B2 | 1/2012 | Sittig et al. |
| 8,103,590 B2 | 1/2012 | Quoc et al. |
| 8,135,699 B2 | 3/2012 | Gupta et al. |
| 8,185,643 B2 | 5/2012 | McMullen et al. |
| 8,364,712 B2 | 1/2013 | O'Sullivan et al. |
| 8,463,740 B2 | 6/2013 | Laird-McConnell et al. |
| 8,464,314 B2 | 6/2013 | Lim |
| 8,498,994 B2 | 7/2013 | Prabaker et al. |
| 8,533,238 B2 | 9/2013 | Yu et al. |
| 8,538,942 B2 | 9/2013 | Barker et al. |
| 8,548,992 B2 | 10/2013 | Abramoff et al. |
| 8,595,220 B2 | 11/2013 | Drucker et al. |
| 8,666,961 B1 | 3/2014 | Qureshi et al. |
| 8,825,611 B1 | 9/2014 | Jorgensen et al. |
| 8,925,041 B2 | 12/2014 | Bulumulla et al. |
| 2002/0059076 A1 | 5/2002 | Grainger et al. |
| 2002/0095305 A1 | 7/2002 | Gakidis et al. |
| 2003/0065519 A1 | 4/2003 | Gibson et al. |

(Continued)

OTHER PUBLICATIONS

Wikipedia, "Facebook Features", [online][retrieved Sep. 25, 2011] http://en.wikipedia.org/w/index.php?title=Facebook_features&printable=yes, pp. 1-17.

(Continued)

*Primary Examiner* — Tsan-Yu J Huang

(57) ABSTRACT

Provided are a computer program product, system, and method for providing access to documents requiring a non-disclosure agreement (NDA) in an online document sharing community. A document request is received from a requesting participant at a requesting participant computer comprising one of the participant computers in the network environment. In response to receiving the document request, an access page is returned to the requesting participant computer including a non-disclosure agreement (NDA) requesting that the requesting participant accept terms of the NDA in order to access the content of the document in the storage system. The content of the document is returned to the requesting participant computer in response to receiving indication from the requesting participant computer accepting the terms of the NDA.

20 Claims, 19 Drawing Sheets

(56) References Cited

U.S. PATENT DOCUMENTS

| | | | |
|---|---|---|---|
| 2003/0187834 A1 | 10/2003 | Oda et al. | |
| 2005/0033615 A1 | 2/2005 | Nguyen et al. | |
| 2006/0010377 A1 | 1/2006 | Anecki et al. | |
| 2007/0150299 A1* | 6/2007 | Flory | 705/1 |
| 2008/0037052 A1 | 2/2008 | Nishiguchi | |
| 2008/0114834 A1 | 5/2008 | Miyazaki | |
| 2008/0243642 A1 | 10/2008 | Ramer | |
| 2008/0244429 A1 | 10/2008 | Stading | |
| 2008/0250021 A1 | 10/2008 | Boys et al. | |
| 2008/0250332 A1 | 10/2008 | Farrell et al. | |
| 2008/0300933 A1 | 12/2008 | Britton et al. | |
| 2008/0320603 A1 | 12/2008 | Ito | |
| 2009/0144392 A1 | 6/2009 | Wang et al. | |
| 2009/0228322 A1 | 9/2009 | Os et al. | |
| 2009/0307577 A1 | 12/2009 | Lee | |
| 2010/0031140 A1 | 2/2010 | Cummins | |
| 2010/0064354 A1 | 3/2010 | Irvine | |
| 2010/0114936 A1 | 5/2010 | Gupta | |
| 2010/0131547 A1 | 5/2010 | Magrath et al. | |
| 2010/0153282 A1 | 6/2010 | Graham | |
| 2010/0211887 A1* | 8/2010 | Woollcombe | 715/751 |
| 2010/0228678 A1 | 9/2010 | Sorensen et al. | |
| 2010/0250340 A1 | 9/2010 | Lee et al. | |
| 2010/0251145 A1 | 9/2010 | Leppert et al. | |
| 2010/0274732 A1 | 10/2010 | Grinchenko et al. | |
| 2010/0306670 A1 | 12/2010 | Quinn et al. | |
| 2010/0318559 A1 | 12/2010 | Yan et al. | |
| 2010/0324975 A1 | 12/2010 | Berger | |
| 2010/0325133 A1 | 12/2010 | Rounthwaite et al. | |
| 2010/0332404 A1 | 12/2010 | Valin | |
| 2011/0023096 A1 | 1/2011 | Xiao et al. | |
| 2011/0072002 A1 | 3/2011 | Kirby et al. | |
| 2011/0093506 A1 | 4/2011 | Lunt et al. | |
| 2011/0153560 A1 | 6/2011 | Bryant et al. | |
| 2011/0225135 A1 | 9/2011 | Konchitsky et al. | |
| 2012/0095849 A1 | 4/2012 | Berger | |
| 2012/0143917 A1 | 6/2012 | Prabaker et al. | |
| 2012/0173442 A1 | 7/2012 | Gupta et al. | |
| 2012/0191792 A1 | 7/2012 | Chebiyyam | |
| 2012/0192286 A1* | 7/2012 | Messing et al. | 726/27 |
| 2012/0210254 A1 | 8/2012 | Fukuchi et al. | |
| 2012/0226515 A1 | 9/2012 | Boss et al. | |
| 2013/0046761 A1 | 2/2013 | Soderberg et al. | |
| 2013/0054640 A1 | 2/2013 | Najork et al. | |
| 2013/0125009 A1 | 5/2013 | DeLuca et al. | |
| 2013/0138638 A1 | 5/2013 | Karenos et al. | |

OTHER PUBLICATIONS

"Facebook User Guide", GED Testing Service, 2009, pp. 1-18.
"flickr/Help/FAQ/General Flickr Questions", [online][retrieved Oct. 12, 2011] http://flickr.com/help/general/, pp. 1-5.
Wikipedia, "Flickr", [online][retrieved Oct. 12, 2011] http://en.wikipedia.org/w/index.php?title=Flickr&printable=yes, pp. 1-12.
"flickr:Help", [online][retrieved Oct. 12, 2011] http://flickr.com/help/faq/, pp. 1-350.
"Defensive Publishing", Prior Art Database IP.com [online][retrieved Sep. 24, 2011] http://priorartdatabase.com/defensive-publishing.html#how-it-works, pp. 1-3.
"Learning Center Introduction", Prior Art Database IP.com,, [online][retrieved Sep. 24, 2011] http://priorartdatabase.com/prior-art-database-learning-center.html, pp. 1-2.
"Searching Overview", Prior Art Database IP.com,, [online][retrieved Sep. 24, 2011] http://priorartdatabase.com/prior-art-database-searching.html.
"Welcome to the Prior Art Database", Prior Art Database IP.com [online][retrieved Sep. 25, 2011] http://priorartdatabase.com.
"How to Upload a Video to YouTube", [online][retrieved Oct. 22, 2011] http://www.google.com/support/youtube/bin/answer.py?hl=en&answer=57924.
"Welcome to Promoted Videos", [online][retrieved Oct. 22, 2011] http://ads.youtube.com/index.
"Private Videos and How to Share Them", [online][retrieved Oct. 22, 2011] http://www.google.com/support/youtube/bin/answer.py?hl=en&answer=1 . . . , pp. 1-3.
US Patent Application entitled "Providing Access to Documents in an Online Document Sharing Community", filed Mar. 16, 2012, by inventor David W. Victor.
US Patent Application entitled "Inviting Participants in an Online Document Sharing Community to Accept Terms of a Non-Disclosure Agreement (NDA) to Access a Document", filed Mar. 16, 2012, by inventor David W. Victor.
US Patent Application entitled "Providing Access to Documents of Friends in an Online Document Sharing Community Based on Whether the Friends' Documents are Public or Private", filed Mar. 16, 2012, by inventor David W. Victor.
US Patent Application entitled "Providing Different Access to Documents in an Online Document Sharing Community Depending on Whether the Document is Public or Private", filed Mar. 16, 2012, by inventor David W. Victor.
Office Action dated Aug. 12, 2014, pp. 61, for U.S. Appl. No. 13/424,049, filed Mar. 19, 2012.
Response dated Aug. 12, 2014, pp. 15, to Final Office Action dated May 8, 2014, pp. 32, for U.S. Appl. No. 13/424,106, filed Mar. 19, 2012.
Response dated Sep. 4, 2014, pp. 16, to First Office Action dated Jun. 4, 2014, pp. 77, for U.S. Appl. No. 13/424,037, filed Mar. 19, 2012, by inventor D.W. Victor.
Response dated Dec. 15, 2014, pp. 18, to Office Action dated Aug. 12, 2014, pp. 61, for U.S. Appl. No. 13/424,049, filed Mar. 19, 2012.
Final Office Action dated Jan. 28, 2015, pp. 65, for U.S. Appl. No. 13/424,037, filed Mar. 19, 2012, by inventor D.W. Victor.
Office Action dated Dec. 1, 2014, pp. 39, for U.S. Appl. No. 13/424,124, filed Mar. 19, 2012.
Response dated Jan. 16, 2014, pp. 16, to Office Action dated Oct. 16, 2013, pp. 30, for U.S. Appl. No. 13/424,106, filed Mar. 19, 2012.
Final Office Action dated May 8, 2014, pp. 32, for U.S. Appl. No. 13/424,106, filed Mar. 19, 2012.
Final Office Action dated Mar. 7, 2014, pp. 29, for U.S. Appl. No. 13/424,124, filed Mar. 19, 2012.
Office Action dated Aug. 26, 2013, pp. 27, for U.S. Appl. No. 13/424,124, filed Mar. 19, 2012, by inventor D.W. Victor.
First Office Action dated Jun. 4, 2014, pp. 77, for U.S. Appl. No. 13/424,037, filed Mar. 19, 2012, by inventor D.W. Victor.
Amend & AFCP in dated Jun. 9, 2014, pp. 15, in response to Final Office Action dated Mar. 7, 2014, pp. 29, for U.S. Appl. No. 13/424,124, filed Mar. 19, 2012.
Final Office Action dated Feb. 26, 2015, pp. 54, for U.S. Appl. No. 13/424,049, filed Mar. 19, 2012.
Office Action dated Feb. 26, 2015, pp. 41, for U.S. Appl. No. 13/424,106, filed Mar. 19, 2012.
Response dated Mar. 2, 2015, pp. 15, to Office Action dated Aug. 26, 2013, pp. 27, for U.S. Appl. No. 13/424,124, filed Mar. 19, 2012.
Response dated Mar. 30, 2015, pp. 18, to Final Office Action dated Jan. 28, 2015, pp. 65, for U.S. Appl. No. 13/424,037, filed Mar. 19, 2012, by inventor D.W. Victor.
Office Action dated Oct. 16, 2013, pp. 30, for U.S. Appl. No. 13/424,106, filed Mar. 19, 2012.
Response dated Nov. 26, 2013, pp. 13, to Office Action dated Aug. 26, 2013, pp. 27, for U.S. Appl. No. 13/424,124, filed Mar. 19, 2012.
Response dated Feb. 1, 2016, pp. 21, to Office Action dated Sep. 1, 2015, pp. 49, for U.S. Appl. No. 13/424,049, filed Mar. 19, 2012.
Response dated Feb. 8, 2016, pp. 17, to Office Action dated Oct. 6, 2015, pp. 35, for U.S. Appl. No. 13/424,124, filed Mar. 19, 2012.
Office Action dated May 8, 2015, pp. 55, for U.S. Appl. No. 13/424,037, filed Mar. 19, 2012, by inventor D.W. Victor.
Response dated Aug. 10, 2015, pp. 12, to Office Action dated May 8, 2015, pp. 55, for U.S. Appl. No. 13/424,037, filed Mar. 19, 2012, by inventor D.W. Victor.
Notice of Allowance dated Aug. 28, 2015, pp. 10, for U.S. Appl. No. 13/424,037, filed Mar. 19, 2012, by inventor D.W. Victor.
Response dated May 27, 2015, pp. 17, to Final Office Action dated Feb. 26, 2015, pp. 54, for U.S. Appl. No. 13/424,049, filed Mar. 19, 2012.

(56) References Cited

OTHER PUBLICATIONS

Response dated Jun. 26, 2015, pp. 16, to Office Action dated Feb. 26, 2015, pp. 41, for U.S. Appl. No. 13/424,106, filed Mar. 19, 2012.
Final Office Action dated Oct. 6, 2015, pp. 38, for U.S. Appl. No. 13/424,106, filed Mar. 19, 2012.
Final Office Action dated May 21, 2015, pp. 37, for U.S. Appl. No. 13/424,124, filed Mar. 19, 2012.
Response dated Aug. 21, 2015, pp. 16, to Final Office Action dated May 21, 2015, pp. 37, for U.S. Appl. No. 13/424,124, filed Mar. 19, 2012.
Office Action dated Oct. 6, 2015, pp. 35, for U.S. Appl. No. 13/424,124, filed Mar. 19, 2012.

Office Action dated Sep. 1, 2015, pp. 49, for U.S. Appl. No. 13/424,049, filed Mar. 19, 2012.

Response dated Jan. 6, 2016, pp. 17, to Final Office Action dated Oct. 6, 2015, pp. 38, for U.S. Appl. No. 13/424,106, filed Mar. 19, 2012.
Final Office Action dated Apr. 20, 2016, pp. 64, for U.S. Appl. No. 13/424,049, filed Mar. 19, 2012.

* cited by examiner

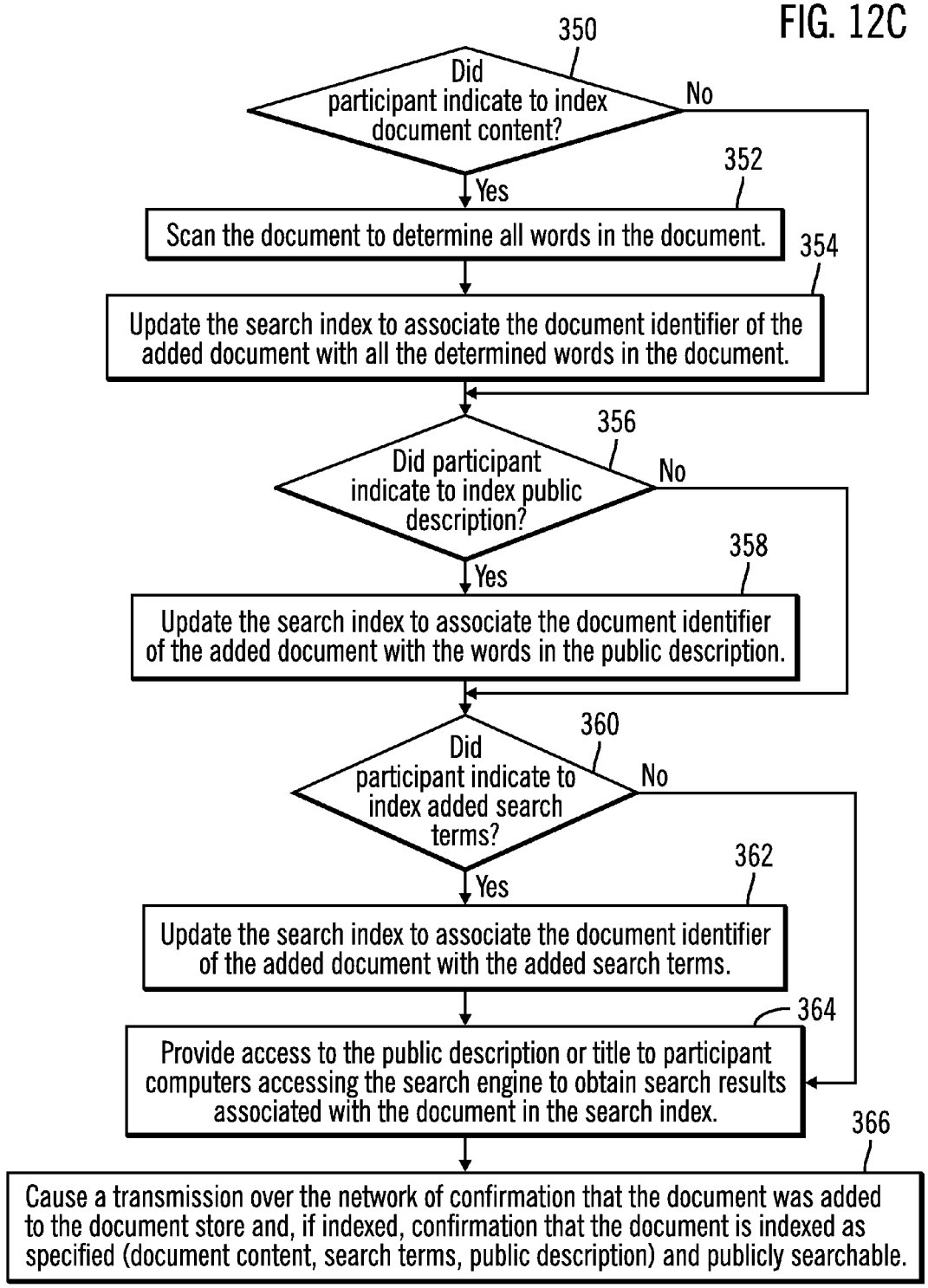

US 9,355,384 B2

PROVIDING ACCESS TO DOCUMENTS REQUIRING A NON-DISCLOSURE AGREEMENT (NDA) IN AN ONLINE DOCUMENT SHARING COMMUNITY

BACKGROUND OF THE INVENTION

1. Field of the Invention

The present invention relates to a computer program product, system, and method for providing access to documents requiring a non-disclosure agreement (NDA) in an online document sharing community.

2. Description of the Related Art

Social networking services provide computer users the ability to establish relations with other computer users over the Internet for the purpose of interacting, sharing information, and communicating. Certain social networking services allow participants to share multimedia content and post comments upon the shared multimedia content that are viewable by other participants in the online community. For instance, YOUTUBE® allows users to post videos accessible to the public or selected groups of users, so that other users may view the videos and provide commentary about the posted videos. FLICKR® allows users to share photos with the general public or select private groups of users, where users may comment upon the photos. Some online services, such as IP.COM's Intellectual Property Library, provide for the sharing of inventive or creative content by allowing inventors to publish their research activity for the purposes of establishing a prior art database. (YOUTUBE is a registered trademark of Google, Inc.; FLICKR is a registered trademark of Yahoo! Inc.; and IP.COM is a registered trademark of IP.COM, LLC).

Notwithstanding the prevalence of social networking services and sites allowing users to interact, communicate, and share information, there is a need in the art for a social networking community that allows creators of artworks and inventions to share those works and interact so as to encourage further innovation and commercialization in a manner that is cognizant of the need to protect intellectual property rights arising from inventive and artistic works.

SUMMARY

Provided are a computer program product, system, and method for providing access to documents requiring a non-disclosure agreement (NDA) in an online document sharing community. The online document sharing community is implemented in a network environment including a plurality of participant computers operated by participants in the online document sharing community and a storage system. A document request is received from a requesting participant at a requesting participant computer comprising one of the participant computers in the network environment. In response to receiving the document request, an access page is returned to the requesting participant computer including a non-disclosure agreement (NDA) requesting that the requesting participant accept terms of the NDA in order to access the content of the document in the storage system. The content of the document is returned to the requesting participant computer in response to receiving indication from the requesting participant computer accepting the terms of the NDA.

BRIEF DESCRIPTION OF THE DRAWINGS

FIGS. 12a, 12b, and 12c illustrate an embodiment of operations to create document information for a document being added to a document store.

DETAILED DESCRIPTION

Figure 1:
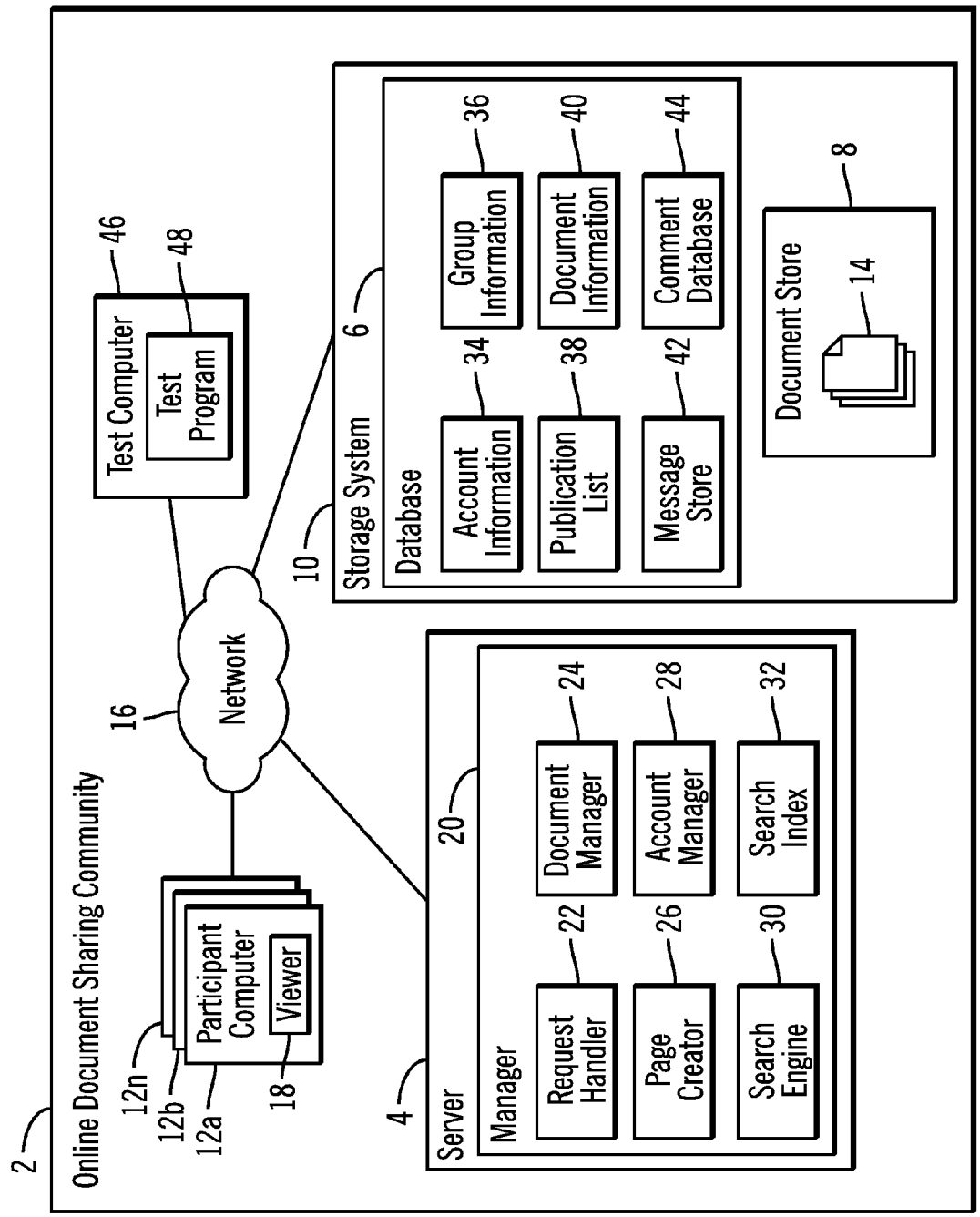
FIG. 1 illustrates a computing environment for an online document sharing community.

Described embodiments provide for an online document sharing community to allow participants to share documents describing inventions and artworks subject to intellectual property protection in a manner that allows participants to protect their intellectual property rights by controlling dissemination of the content of their documents and to expose their documents to other participants to promote development and commercialization. With the online document sharing community embodiments, participants may leverage the expertise of other participants and at the same time control the distribution of their intellectual property so as to preserve intellectual property protection to which they are entitled and release intellectual property in a controlled manner to optimize results, such as establish prior art based on their release.

In described embodiments, participants in the online document sharing community may provide documents to include in a document store and generate document information for the documents. The documents may include subject matter protected by intellectual property laws. Access to the content of the document is provided through the use of a search engine and a search index that allows participants to search documents in the document store based on document content. The server managing the online document sharing community determines a publication time for documents in the document store that indicates a time the search engine makes the content of the document accessible to the participant computers operated by participants not under the obligation of confidentiality to the owner with respect to the document content. This publication time may be verified and used to establish a date the content of the document became prior art under patent laws in the United States and other countries, and used to schedule when to file for patent protection in the United States and other countries based on the determined date the subject matter subject to intellectual property protection became publicly available.

Further embodiments provide techniques to allow an owner of the document in the online document sharing community to control access to the documents in the document store to those participants that have accepted the terms of a non-disclosure agreement (NDA) associated with the document. Upon receiving a request from a requesting participant for a document, an access page is returned to the participant computer including a non-disclosure agreement (NDA) requesting that the requesting participant accept terms of the NDA in order to access the content of the document. The content of the document is returned to the requesting participant computer in response to receiving indication from the requesting participant computer accepting the terms of the NDA. Described embodiments provide the ability for the owner of the document to use the server to control access to the document based on participants accepting the terms of an NDA for the document. Further, information on the number of participants that have accepted and declined the NDA for the document may be recorded to provide meaningful information that may assist the owner in determining potential commercial and investor interest in the subject matter of the document.

Further embodiments provide techniques for generating group information for a group created by the document owner indicating the document and participants in the online document sharing community as invitees. A join message is sent to the invitee participant computers including a description of the document that may exclude the content which may be subject to intellectual property protection (e.g., patent, copyright, trade secret). The join message may include the NDA that the invitee must accept to be provided access to all of the content of the document. The described embodiments provide management of acceptances and declines of the NDA from the join message to record information on acceptances and declines, and allow the owner of the document to manage and follow-up with invitees with respect to the NDA.

Further embodiments provide techniques to associate friends with participants in the online document sharing community so that when a requesting participant requests a page, a determination is made of the friends of the requesting participant and the documents owned by the friends. A determination is made as to whether the friends' documents are private or public to determine whether to include information on the friends' documents in the requested page. For instance, if the document is public, then the returned page may include information and access to the content of the friends' documents. If the friend's documents are private, then the requesting participant computer is only provided access to all the content of those friends' documents when the requesting participant is a member of a group allowed to access those friends' documents. In this way, participants that are friends of other participants may restrict accessibility to their documents to only friends and participants that are specified in the group associated with the private document. By restricting access in this manner, participants may protect any intellectual property rights emanating from the content of their documents by limiting access to their documents to those participants that are under an obligation of confidentiality through an NDA or other oral or written agreement.

Further embodiments provide techniques to determine documents to return to a request for a page of documents from requesting participants of the online document sharing community. Upon determining documents to include in the page, such as documents satisfying a search criteria provided with the request, an access element is included in the returned page to provide access to the content of the document if the document is public or if the document is private and the requesting participant is a member of a group associated with the private document. If the document to include is private and the requesting participant is not a member of the group of participants allowed access, then a public description of the document is included in the page. The public description may exclude those portions of the document content that may be eligible for intellectual property law protection. This allows document owners to restrict dissemination of their intellectual property to selected participants that perhaps have agreed to maintain the content of the document confidential.

Moreover, comments from participants related to the document may be included in the page. If the document is public, then all comments from all participants may be made accessible in the page. Alternatively, if the document is private, then comments from members of the group of the private document may only be included in the page if the requesting participant is also a member of the group. In this way, an owner of a private document may restrict access to the content of the documents and comments concerning the document to only participants that are members of the group of the private document. Participants that are not members of the group of the private document may be limited to only access comments from participants that are not members of the group, but may no not access all the document content and may not access comments from participants that are members of the group, who may be discussing the restricted document content. By limiting access to comments in this way, participants that are not a member of the group of the private document will not have access to the content and comments that may describe the document content subject to intellectual property law protection.

Described embodiments provide an online document sharing community that allows participants to share creative and inventive subject matter and control the sharing of their intellectual property described in documents. In this way, participants may protect intellectual property rights by sharing their document with participants that are authorized or under an obligation of confidentiality. Further, participants may expose their intellectual property in a more public manner to increase commercial and investor interest, and to establish a date of the inventive subject matter to establish a prior art publication date under the patent laws. Described embodiments enhance the sharing of ideas and inventive and creative concepts in a manner that allows participants to obtain meaningful feedback to improve their inventions and artworks, protect their intellectual property rights, and expose their inventions and creative work in a controlled manner to encourage commercialization.

FIG. 1 illustrates an embodiment of an online document sharing community 2 including a server 4 that accesses a database 6 and document store 8 implemented in a storage system 10 to provide participants at participant computers 12*a*, 12*b* . . . 12*n* access to documents 14 and information on documents 14 over a network 16. Each participant computer 12*a*, 12*b* . . . 12*n* includes a viewer program 18 to render a graphical user interface (GUI) to enable the participants using the participant computers 12*a*, 12*b* . . . 12*n* to view information on documents 14 and the documents 14 in the document store 8 and to interact with the server 4. The viewer program 18 GUI may comprise an Internet web browser, an email program, a text message program cable of rendering Short Message Service (SMS), Multimedia Messaging Service (MMS) messages, etc.

The server 4 includes a manager 20 having components to implement the online document sharing community 2, including a request handler 22 to handle requests for documents and information from the participant computers 12*a*, 12*b* . . . 12*n*; a document manager 24 to maintain and manage access to documents 16 in the document store 18; a page creator 26 to manage the creation of pages of document information to return to the participant computers 12*a*, 12*b* . . . 12*n*; an account manager 28 to create and manage participant accounts for participants in the document sharing community; and a search engine 30 to manage search requests for documents 16.

The search engine 30 may include a search index 32 that provides an index of terms and information in the documents 14 in the document store 8 to document 14 identifiers. For instance, the search index 32 may include an entry for every word or metadata included in all the documents 14 added to the document store 8 and, for each index entry, a list of the document identifiers for all the documents 14 that include the word or metadata information for the entry. Upon receiving a search request from a participant computer 12*a*, 12*b* . . . 12*n*, the request handler 22 may provide the search request to the search engine 30, which in turn uses the search index 32 to determine all documents 14 that satisfy the search criteria. The document manager 24 may then determine which of the documents 14 satisfying the search results should be returned to the participant at the participant computer 12*a*, 12*b* . . . 12*n* initiating the request. The page creator 26 may create page content of the search results to return to the requesting participating computer 12*a*, 12*b* . . . 12*n*

The database 6 may include account information 34 having information on participant accounts for participants registered to participate in the online document sharing community; group information 36 having information on groups of participants allowed access to certain of the documents 14; document information 38 having information on each of the documents 14 maintained in the document store 8; a comment database 44 having comments from participants about documents 14 in the document store 8; a message store 42 having messages communicated among participants of the online document sharing community 2; and a publication list 44 indicating publicly available documents 14 that are accessible to the public over the network 16 through the search engine 30.

The server 4, storage system 10, database 6, and document store 8 may be implemented in one computer system or in distributed computing systems distributed across the network 16. In further embodiments, any of the server 4, storage system 10, database 6, and document store 8 may be implemented in one or more computing devices accessible over the network 16. The server 4 and storage system 10 may communicate over the network 16 used by the participant computers 12*a*, 12*b* . . . 12*n* or over dedicated high speed connections not used by the participant computers 12*a*, 12*b* . . . 12*n*.

The database 6 may be comprised of one or more database servers and databases, such as distributed databases, heterogeneous databases, etc., including information on documents 14 that may be returned to the participant computers 12*a*, 12*b* . . . 12*n*.

The network 8 may comprise a Local Area Network (LAN), the Internet, Storage Area Network (SAN), Wide Area Network (WAN), wireless network, etc. The server 4 may comprise one or more enterprise servers, mainframes, servers, etc., and the participant computers 12*a*, 12*b* . . . 12*n* may each comprise a server, desktop computer, workstation, laptop, smart phone, tablet computer, telephony device, personal digital assistant (PDA), etc., or other suitable computing device.

The storage system 10 may comprise one or more suitable storage devices, such as interconnected hard disk drives (e.g., configured as a DASD, RAID, JBOD, etc.), solid state storage devices (e.g., EEPROM (Electrically Erasable Programmable Read-Only Memory), flash memory, Solid State Devices (SSD), flash disk, storage-class memory (SCM)), electronic memory, magnetic tape media, tape cartridges, etc.

The manager 20 components and the viewer 18 may comprise software programs loaded in a memory and executed by a processor. In an alternative embodiments, some portion or all of the manager 20 and viewer 18 components may be implemented in a hardware device, such as a dedicated integrated circuit, e.g., Application Specific Integrated Circuit (ASIC), expansion card, etc.

The documents 14 may comprise one or more files encoded in a computer readable digital format representing one or more of text, images, video, 3D graphics, software code, etc. In certain embodiments, the documents 14 may include content subject to intellectual property protection, such as technical descriptions of utility and design inventions, drafts of patent applications not yet filed, filed but unpublished patent applications, published patent applications, issued patents, designs, artistic works, movie treatments, screenplays, books, video, music, movies, documentaries, short stories, software programs, images of artworks, etc., which may be subject to copyright, trade secret, patent, and other forms of intellectual property protection. The documents 14 may include content that is publicly available and distributed or include content maintained by a registered participant of the online document sharing community 2 as confidential and restricted. Documents 14 are provided to the server 4 by registered participants having account information 34 in the database 6.

The online document sharing community 2 may further include one or more test computers 46 at various geographical locations which include a test program 48 to test the public availability of documents 14 in the document store 14 through the search engine 30.

Figure 2:
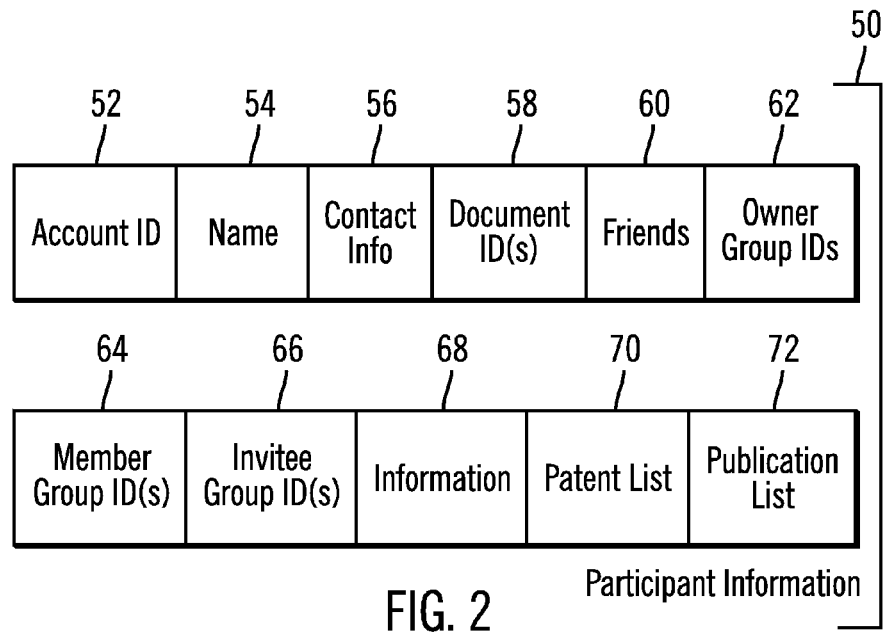
FIG. 2 illustrates an embodiment of participant information.

FIG. 2 illustrates an embodiment of participant information 50 maintained in the account information 30 in the database for registered participants that participate in the online document sharing community. In certain embodiments, publicly available documents 14 may be accessible only to registered participants having account information 34 or may be accessible to any computer participant accessing the search engine 30 over the network 16, including non-registered participants. The participant information 50 provides information on a registered participant that may comprise a person or a fictional person such as a business, corporation, trade group, public interest organization, government body, non-governmental organization, etc. The participant information 50 may include a participant identifier (ID) 52; a provided legal name of the participant 54; contact information 56, such as street address, phone number, email address, web site, etc.; document identifiers (IDs) 58 of documents 14 that the identified participant owns; friends 60 comprising registered participants in the document sharing community that have been acknowledged by the participant 52 as friends; owner group identifiers (IDs) 62 identifying groups of participants of which the participant 52 is the owner, meaning the participant 52 has the authority to edit participants and information in the identified groups 62; member group IDs 64 of groups in which the participant 52 is a member; invitee group IDs 54 of groups in which the participant is an invitee, meaning that there is an outstanding invitation to the participant 52 to join a group that the participant 52 has not accepted; information on the participant 68, such as background information on the entity if the participant 52 is an entity or curriculum vitae information if the participant 52 is a person; a patent list 70 of patents and patent publications worldwide in which the participant 52 is named as an inventor, applicant or assignee; and a publication list 72 of publications in which the participant 52 is named as an author, owner, sponsor, etc. The patents and publications indicated in the lists 70 and 72 may comprise documents 14 in the document store 8.

A participant is an owner of a document in the document store 8, such as the documents 14 identified in field 58 of the participant information 50, if the participant has control over the document in the online document sharing community. Ownership of a document in the online document sharing community 2 does not imply that the participant owner also has legal rights to the content of the document, such as rights arising from being the assignee, creator or inventor. However, the online document sharing community may require that the participant submitting a document to the server 2 certify that they have legal rights to the document authorizing them to submit the document to the online document sharing community 2.

Figure 3:
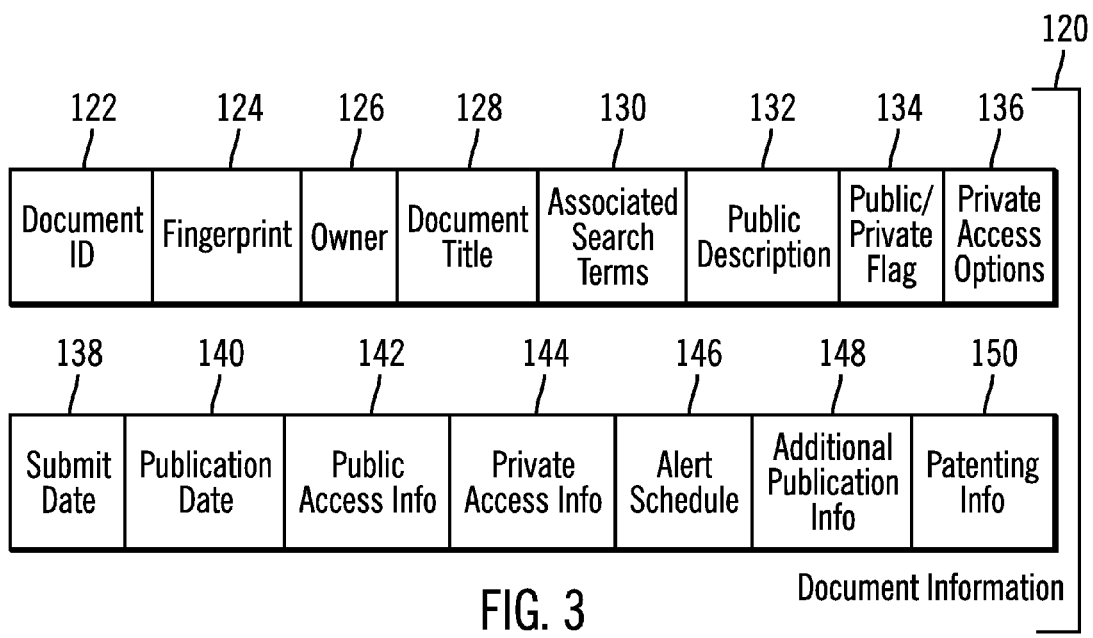
FIG. 3 illustrates an embodiment of document information.

FIG. 3 illustrates an embodiment of document information 120 maintained in the document information 34 for each document 14 maintained in the document store 8. The document information 120 includes a document identifier (ID) 122 providing a unique identifier of one of the documents 14; a fingerprint 124 providing a unique code calculated by a fingerprinting algorithm, e.g., hash function, Rabin's fingerprinting algorithm, etc., from the data in the document 14 to uniquely identify the data of the document 14 (the document ID 122 and 124 may comprise different or the same values); an owner 126 of the document for purposes of controlling the document in the server 4; a document title 128; associated search terms 130 provided by the owner 126 to use to index the document in the search index 32; a public description 132 comprising a general description of the nature of the document 122 suitable for public distribution that may not include all the content of the document 122, such as may not include the novel, inventive, original creative aspects of the content protected by intellectual property laws that the owner 126 wants to maintain private; a public/private flag 134 indicating whether the document 122 is (1) public, meaning that the document 122 is accessible to any participant, who may or may not be registered in the account information 34, searching for the document through the search engine 30, or (2) private, meaning that the document 14 is only accessible to participants that are members of a group the owner 126 associates with the document 14; private access options 136 indicating options used to control access to the document 122 indicated as private 134; a submit date 138 indicating a date and time the document 122 was submitted to the manager 20 for inclusion in the document store 8; a publication date 140 indicating a date and/or time the document 122, if dedicated to the public, was made publicly available through the search engine 30 in a manner sufficient to constitute a public disclosure under the patent, copyright, and/or trade secret laws; public access information 142 providing information on the circumstances in which a public document 122 was made publicly available; private access information 144 providing information in which a private document 122 was accessed by participants indicated in the group associated with the document 122; an alert schedule 146 indicating alerts to generate to the owner 126 to remind the owner of due dates for filing one or more patent applications related to the document 122; additional publication information 148 identifying publicly available publications, movies, books, online distributions, etc., describing the subject matter of the document 122; and patenting information 150 identifying patents and patent applications filed anywhere in the world that cover the inventive subject matter described or enabled (as that term is understood under 35 U.S.C. §112, par. 1 of the patent laws) in the document 122.

In certain embodiments, the public description 132 may describe the general nature or field to which the document 14 pertains without providing details that would constitute a public divulgation of any inventions or original work described in the document 122 subject to patent, copyright and/or trade secret protection, where the public divulgation could affect the patent, copyright or trade secret protection arising from the document 122. The alert schedule 146 may provide the owner/author 126 alerts for due dates to file a patent application for documents 122 made publicly available to remind the owner 126 to file an application covering the inventive subject matter of the document 122 within a year of any public disclosure, such as the publication date 140, to ensure patent protection under the patent laws of the United States, which require that a patent application for an invention be filed within one year of the date the invention was divulged to the public by the owner 126. For instance, the alert 146 may remind the owner 126 to file a patent application covering the inventive subject matter of a publicly disclosed document 14 within one year of the publication date 140. Further, the alert 146 may remind the owner of the document of any foreign filing deadlines based on a priority date of a filing of a patent application in any country covering the inventive subject matter described in the document 14.

Figure 4:
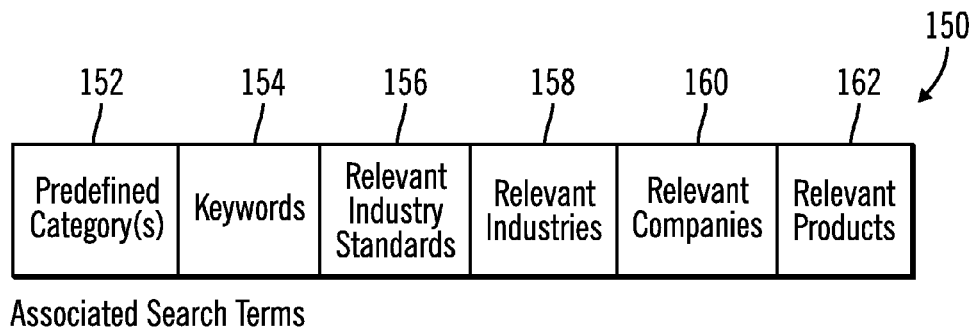
FIG. 4 illustrates an embodiment of associated search terms included in the document information.

FIG. 4 illustrates an embodiment of associated search terms 150 included by the owner 126 in the associated search terms 130 field of the document information 120 for one document 14, including a predefined category 152 describing a category of the content of the document 122; keywords 154 describing the content of the document 124; relevant industry standards 156 to which the content of the document 122 is applicable; relevant companies 160 that may be interested in the content of the document 122; and relevant products 162 that may be related to the subject matter of the document 122. The document manager 24 may include entries in the search index 32 for the associated search terms 152, 154, 156, 158, 160, 162 to indicate documents that also are associated with or include the associated search terms 150. In this way, a query presented to the search engine 30 including as criteria associated search terms 150 may return documents 14 that include or are associated with the associated search terms 150, in addition to documents 14 that include the search criteria in their document content.

Figure 5:
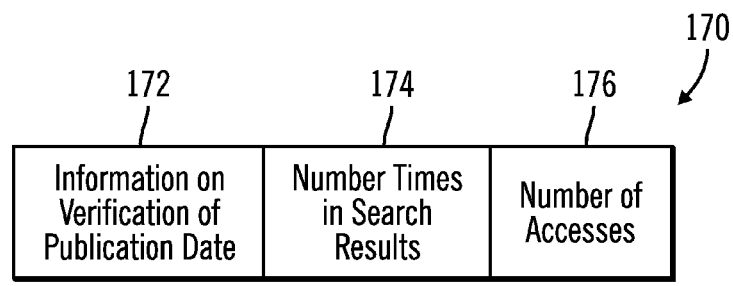
FIG. 5 illustrates an embodiment of public access information included in the document information.

FIG. 5 illustrates an instance 170 of public access information 142 included in the document information 120 for a document 122, including: information on verification of the publication date 172 to verify that the document 122 was in fact publicly available at the publication date 140; a number times in search results 174 indicating a number of times the document 122 was returned in a response to queries from participant computers 12a, 12b . . . 12n; and a number of accesses 176 indicating a number of times participants at the participant computers 12a, 12b . . . 12n accessed the document in the viewer 18.

Figure 6:
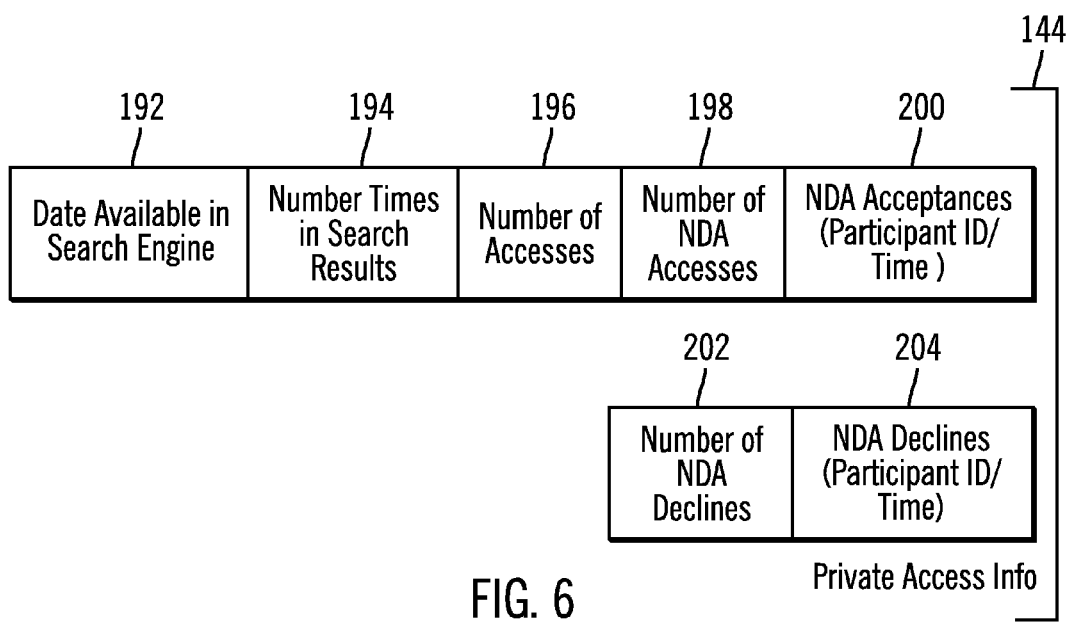
FIG. 6 illustrates an embodiment of private access information included in the document information.

FIG. 6 illustrates an embodiment of an instance of the private access information 144 included in the document information 120 for a document, including: a date available 192 in the search engine 30 indicating the date the private document 120 was indexed in the search index 32; a number times in search results 194 indicating a number of times the document 122 was returned in a response to a query from a participant computer 12a, 12b . . . 12n; a number of accesses 196 indicating a number of times participants at the participant computers 12a, 12b . . . 12n accessed the document 122 in their viewer 18; a number of non-disclosure agreement (NDA) accesses 192 indicating a number of times participants accessed the NDA for the document 122, which must be accepted before access to the private document 122 is permitted; the NDA acceptances 200 indicating the participant IDs of participants (persons and entities) that have accepted the terms of the NDA associated with the document 14 and a date/time of acceptance; a number of NDA declines 202 indicating a number of times the NDA associated with the document 122 was declined; and NDA declines 204 indicating the participant IDs (persons and entities) that have declined the terms of the NDA associated with the document 14 and a date/time the NDA was declined.

Figure 7:
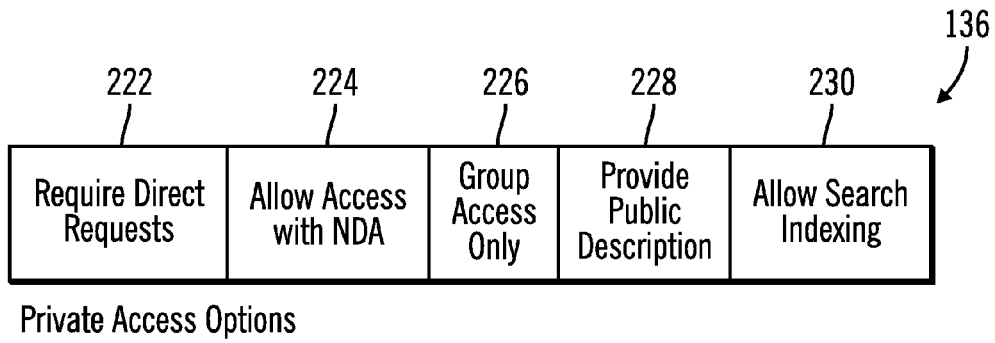
FIG. 7 illustrates an embodiment of public access options included in the document information.

FIG. 7 illustrates an embodiment of an instance of the private access options 136 included in the document information 120 of a document 122, including: a require direct requests 222 indicating whether the owner 126 requires that any request for a private document be submitted to the owner 126 participant computer 12a, 12b . . . 12n to consider whether to allow access; allow access with NDA 224 indicating whether the owner 126 requires that an NDA be accepted before a participant may access the document 122; a group access only 226 field indicating whether access to the document 122 is only provided to members of a group associated with the document 122; a provide public description 228 field indicating whether a public description 132, title 128 etc. is provided in response to a request for a private document from a participant not authorized to access the document; and an allow search indexing 230 field indicating whether the owner 26 wants the private document to be indexed in the search index 32 so that the public description 132 or title 128 may be provided in response to search requests that the document 122 satisfies. With the public description 132, the owner 126 may provide different participants information on the general nature of the document 122 in response to search requests without disclosing novel, inventive or original aspects of the content of the document 122 whose disclosure could affect patent, copyright, and/or trade secret rights to the non-disclosed content in the document. Alternatively, the owner 126 may specify that the content of the document 122 is not indexed in the search index 32 so that information on the document 122 is not returned in response to search requests to the search engine 30.

Figure 8:
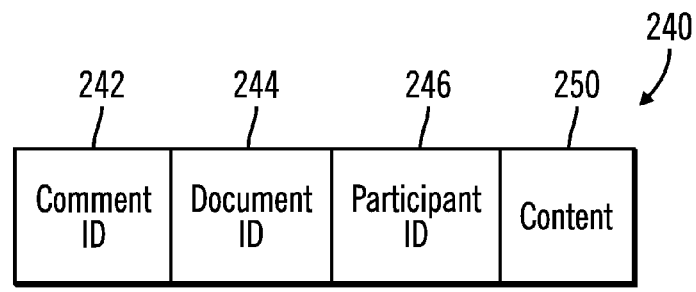
FIG. 8 illustrates an embodiment of a comment entry included in the comment database.

FIG. 8 illustrates an embodiment of a comment entry 240 maintained in the comment database 44 for each comment. In certain embodiments, only registered participants indicated in the account information 34 may present comments for documents 14. A comment entry 240 includes a comment ID 242 providing a unique identifier of the comment; a document ID 244 to which the comment 242 applies; a participant 246 ID (person or entity) that created the comment 242; and the comment content 248, which may comprise text, audio, images, video provided by the participant 246 to provide commentary or thoughts on the document 244.

Figure 9:
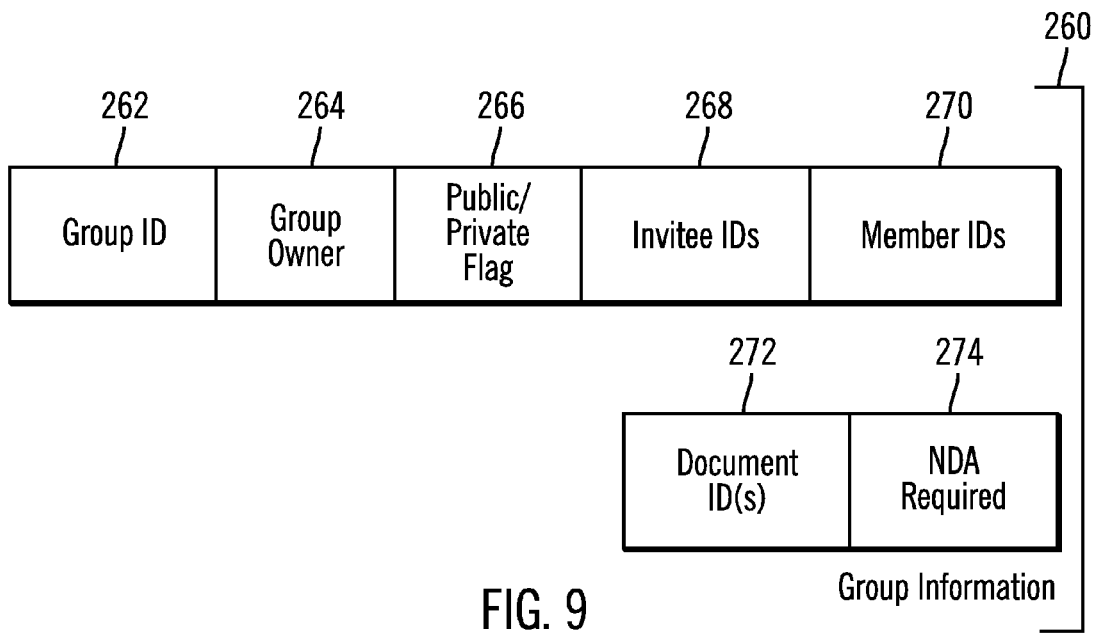
FIG. 9 illustrates an embodiment of a group information entry.

FIG. 9 illustrates an embodiment of an instance of group information 260 maintained in the group information 36 for a group of participants that may be associated with one or more documents 14. The group information 260 includes a group identifier (ID) 262 to uniquely identify the group; a group owner 264 indicating the registered participant (person or entity) that created the group and/or has the authority to modify and delete the group 262; a public/private flag 266 indicating whether the group is private and only includes members selected by the group owner 264 or is public and permits participants to join without pre-approval by the group owner 264; invitee IDs 268 indicating registered participants that the group owner 264 has invited to join the group 262 that have not yet joined; member IDs 270 indicating registered participants that have accepted the invitation, i.e., have transitioned from an invitee state to a member state, or others that have joined the group 262; document identifier (IDs) 272 identifying one or more documents that are assigned to the group 262, such that only members 270 of the group may access the documents 272 assigned to the group 262; an NDA required field 274 indicating whether acceptance of the terms of an NDA is required to join the group 262; and an NDA content field 276 providing the content or terms of the NDA. In certain embodiments, the NDA content 276 may provide a default NDA, one of multiple NDA agreements provided by the manager 20 that are selected by the group owner 264 or may comprise an NDA provided by the group owner 264.

Figure 10:
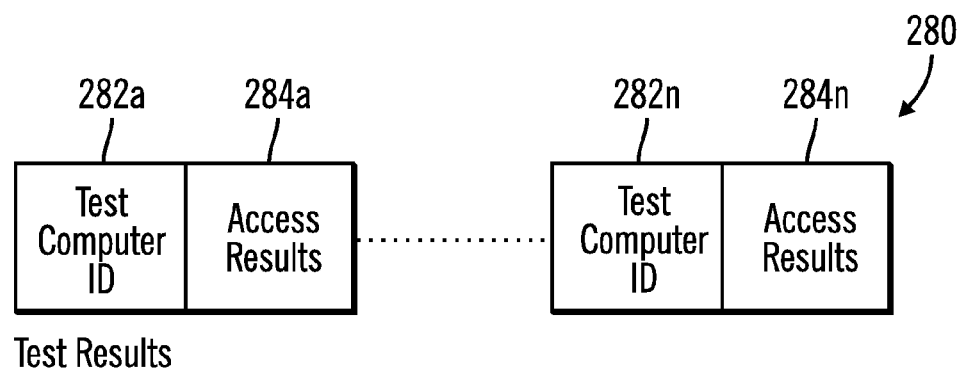
FIG. 10 illustrates an embodiment of test results to verify that a document is publicly available.
Figure 11:
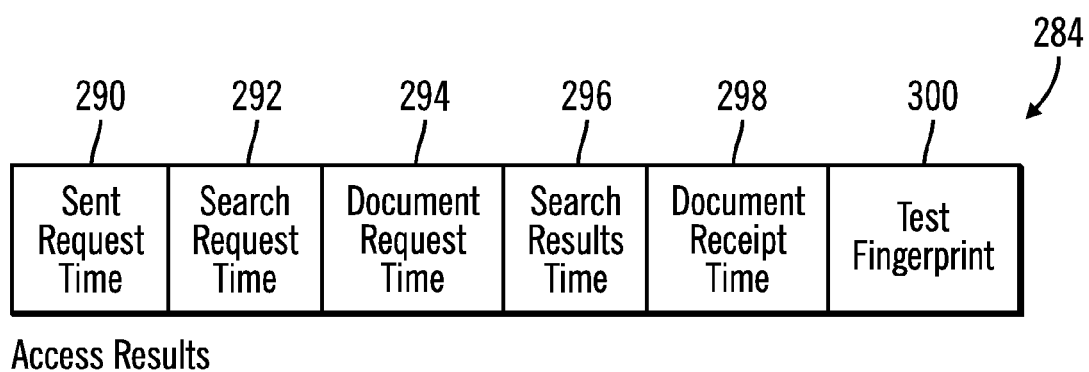
FIG. 11 illustrates an embodiment of access results for the test results.

FIGS. 10 and 11 concern information maintained for a document 14 that may be part of the information generated when verifying the publication date 172 in the public access information 170 for a document 14.

FIG. 10 provides publication test results 280 that may be associated with the document information 40 used to confirm that an indexed document 14 is publicly accessible such as to be sufficient to constitute a public disclosure according to the patent laws, copyright and/or trade secret laws of the United States and other countries. The test results 280 for a document 14 indicate one or more test computer identifiers (IDs) 282a . . . 282n of computers 46 at various remote locations in the network 16 that are recruited to test the public accessibility of the document 14 through the search engine 30 and access results 284a . . . 284n indicating the results of attempted accesses of the document 14 by the corresponding test computer identifiers 282a . . . 282n through the search engine 30 over the network 16.

FIG. 11 illustrates an embodiment of access results 284, such as access results 284a . . . 284n, including a sent request time 290 of a time the server 4 sent the computer 282a . . . 282n a request to test the availability of the document, which may include search terms indexed for the document in the search index 32; a search request time 292 indicating a time the test computer 284a . . . 284n received the search results identifying the document by sending a request to the search engine search engine 30 for search terms associated with the document 122 in the search index 32; a document receipt time 294 the test computer 282a . . . 282 received the requested document from the server 4 based on the received search results; and a test fingerprint calculated by the test computer 284a . . . 284n from the received document 14 that can be compared against the fingerprint 124 in the document information 120 to verify that the test computer 284a . . . 284n received the same document 122 maintained in the document store 8 available through the search engine 30.

The information described with respect to FIGS. 2-11 may be stored in one or more records, entries or other data structures (e.g., Extended Markup Language (XML) files) maintained in the database 6.

Figure 12A:
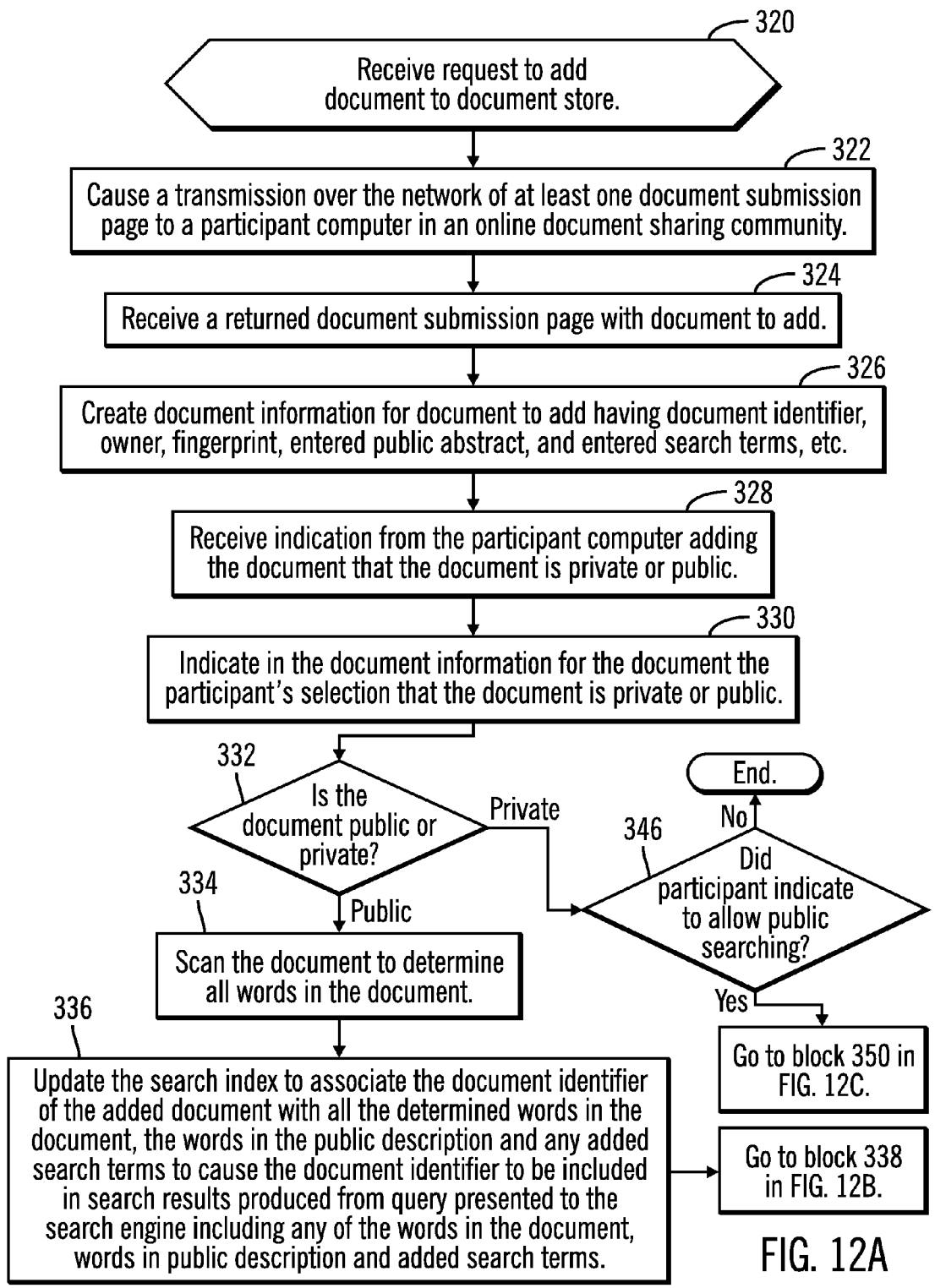
Figure 12B:
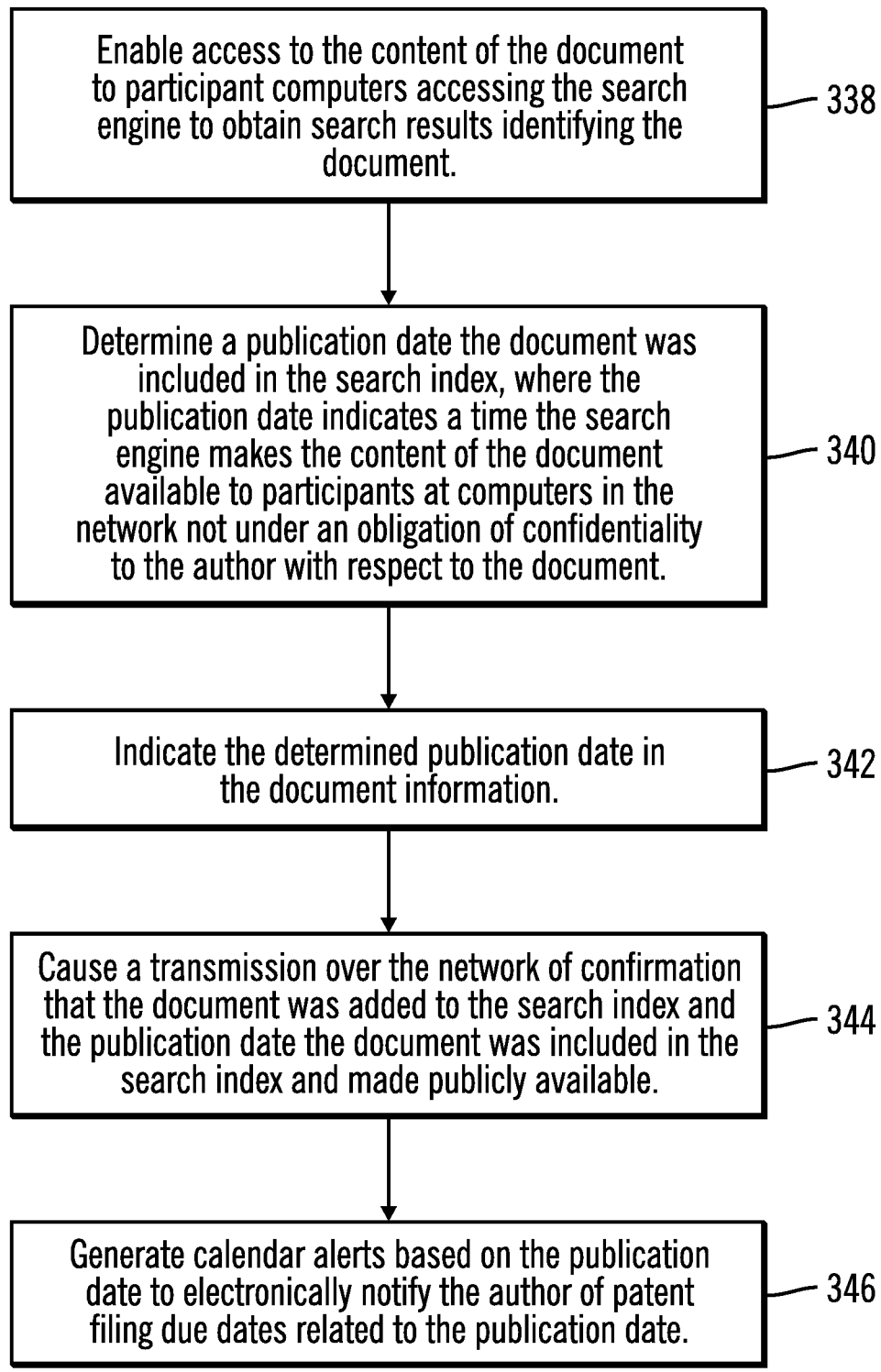

FIGS. 12a, 12b, and 12c illustrate an embodiment of operations performed by the document manager 24 or some other component to add document information 120 to the database 6 for a document 14 being added to the document store 8. The operations to add document information 120 are initiated (at block 320) upon receiving a request for at least one document submission page from a participant computer 12a, 12b . . . 12n operated by a participant in the document sharing community for which participant information 120 is maintained in the database 6. The request handler 22 causes (at block 322) a transmission over the network 16 of at least one document submission page 400 (FIG. 13) to the participant computer 12a, 12b . . . 12n used by the participant in the online document sharing community 2. By causing a transmission, the server 4 causes the transmission through the switches and routers of the network 16 to reach the final destination participant computer 12a, 12b . . . 12n.

Figure 13:
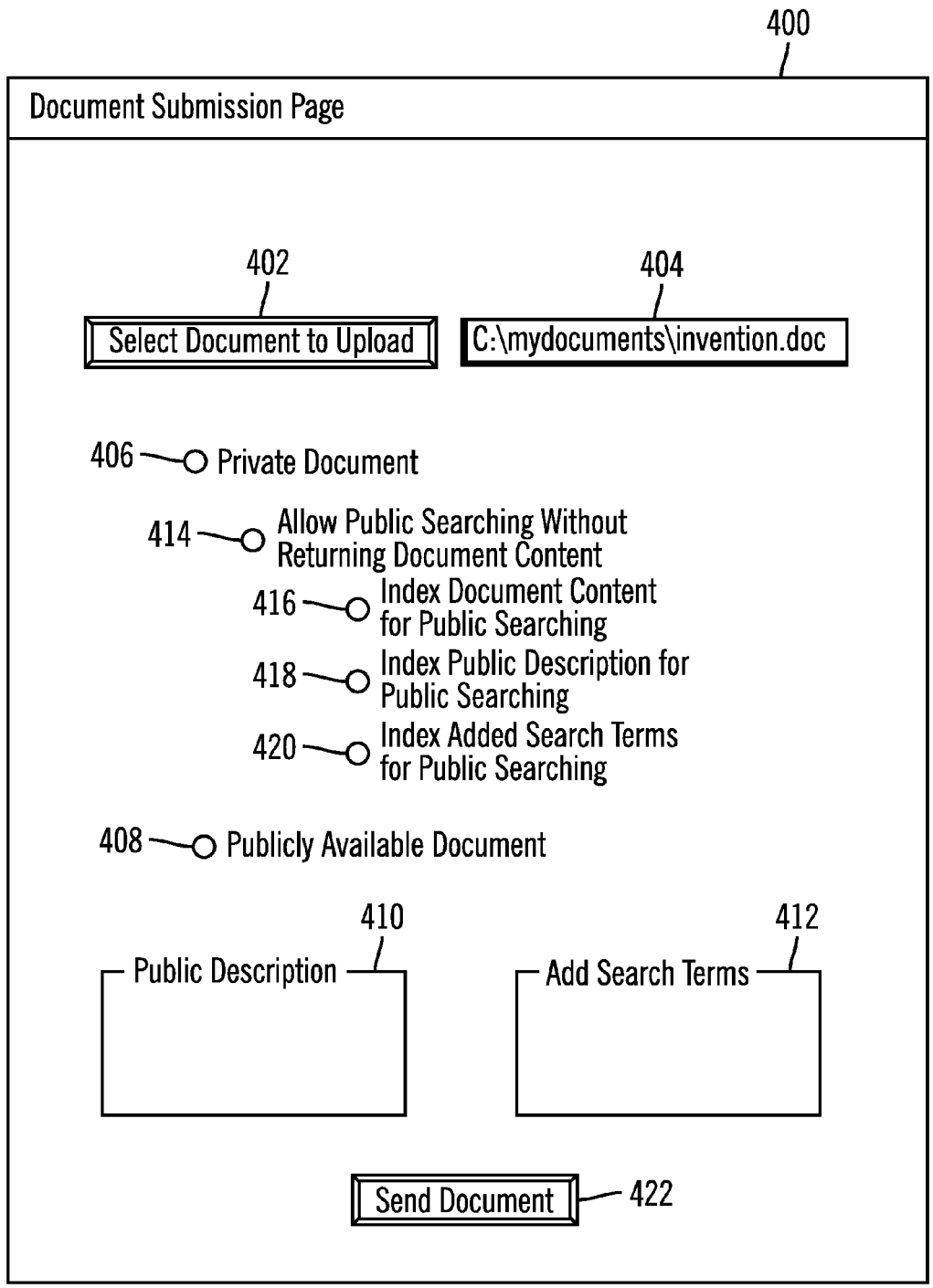
FIG. 13 illustrates an embodiment of a document submission page.

FIG. 13 provides an embodiment of a document submission page 400 having a select document graphical element 402 to enable the participant to select a document available through their participant computer 12a, 12b . . . 12n to upload to the server 4, which selected document is displayed in selection field 404. A graphical element comprises a user interface control, such as a displayed button, text, icon, etc. that enables the participant to initiate a command associated with the graphical element, such as to upload a document 402. The select document graphical element 402 enables the participant at the participant computer 1a, 12b . . . 12n to select a document to transmit to the server 4 to associate the transmitted document with the participant's information 50 (FIG. 2). Graphical elements 406 and 408 further enable the participant to indicate whether the document is private 406 or to be made publicly available 408.

The participant may further enter a public description in a public description field 410 to be returned with search results for private and public documents. The public description 410 may be saved as the public description 132 in the document information 120 and may comprise a general description of the document 122. For private documents, the public description may comprise a general description of the field to which the document pertains that does not disclose subject matter that would jeopardize any intellectual property rights (e.g., patent, copyright, trade secret) in the United States and other countries arising from the full document contents.

The participant may further enter search terms 412 in the add search terms field 412, which may be saved as the associated search terms 130 in the document information 120. The added search terms 412 may include keywords, relevant industry standards, relevant industries, relevant companies, and relevant products.

Upon selecting the private option 406, the submission page 400 may allow the participant to select an allow public searching graphical element 414 to indicate whether the private document can be searched through the search index 32 by participants not under an obligation of confidentiality to the owner of the document without returning all the document content, such as the content subject to intellectual property protection. Further, upon selecting the option to allow public searching 414, the submission page 400 may further display graphical elements to indicate which content may be indexed in the search index 32 for public searching by participants not under an obligation of confidentiality to the document owner with respect to the document. An index document content graphical element 416 allows the participant to select whether the text in the document may be indexed in the search index 32, an index public abstract graphical element 418 allows the participant to select whether the text in the entered public description 410 may be indexed in the search index 32 for the document, and an index added search terms graphical element 420 allows the participant to select whether the added search terms entered in box 412 may be indexed in the search index 32 for the document.

The send document graphical element 422 causes the transmission of the document with the private and public related selections entered in the submission page 400 using graphical elements 406, 408, 414, 416, 418, 420 and the information entered in the fields 410 and 412. The participant may not enter any description in box 410 for the public description 132 so that no public description is provided when the private document is returned in a search to a participant not under an obligation of confidentiality to the owner with respect to the document.

If the document is indicated as public, then the entire document is made available to participants not under an obligation of confidentiality to the document owner with respect to the document through the search engine 30 and the publication date indicates a time the search engine 30 makes the content of the document available to the computer participants of the network not under an obligation of confidentiality to the owner with respect to the document. In this way, selecting the send document graphical element 422 for a public document causes the server 4 to verify or determine the publication date 140 when the document is publicly available through the search engine 30 to participants not under an obligation of confidentiality to the document owner with respect to the document being added.

The graphical elements 402 through 420 may be rendered in one transmitted document submission page 400 or rendered in multiple document submission pages.

Upon receiving (at block 324) a returned document 14 to add via the invocation in the at least one document submission page 400 along with the information entered in the document submission page 400, the document manager 24 creates (at block 326) document information 120 (FIG. 3) for the document 14 to add having a document identifier 122, owner 126, a fingerprint 124 calculated using a fingerprint algorithm, any entered public description 132 and search terms entered in fields 410 and 412, and other of the participant entered information for the document information 120.

The document manager 24 further indicates (at block 330) in the document information 120 the participant's selection in the document submission page 400 that the document is public or private in the public/private flag 134. If (at block 332) the document is public, then the document manager 24 scans (at block 334) the document to determine all words in the document. The document manager 24 updates (at block 336) the search index 32 to associate the document identifier of the added document with all the determined words in the document, the words in the public description (entered in field 410 of the document submission page 400) and any added search terms (entered in field 412 of the document submission page 400) to cause the document identifier 122 to be included in search results produced from queries presented to the search engine 30 specifying any of the words or stems of the words in the document, words in the public description 132 and added search terms 130.

Control then proceeds to block 338 in FIG. 12b where the document manager 24 enables (at block 338) access to the content of the document 122 to the participants accessing the search engine 30 to obtain search results identifying the document 122. For public documents, the document manager 24 further determines (at block 340) a publication date 140 the document was included in the public search index 32. The publication date 140 indicates a time/date the search engine 30 made the full content of the document available to the participants of the online community not under an obligation of confidentiality to the owner of the document, which may or may not include unregistered participants of the network 16. The determined publication date is indicated (at block 342) in the field 140 of the document information 120 being generated for the added document. The document manger 24 then causes (at block 344) a transmission over the network 16 of confirmation that the document was added to the search index 32 and the publication date 140 indicating the time/date that the document was included in the search index 32 and made publicly available to participants not under an obligation of confidentiality to the owner of the document with respect to the document. In certain embodiments, the server 4 verifies that the document is publicly available to satisfy the requirements for a public disclosure under patent laws of the United States and other countries, which may require that the server 4 verifies that other computers may access the document as a result of searching for the document through the search engine 30. The document manager 24 may further generate (at block 346) calendar alerts based on the publication date 140 to electronically notify the author of patent filing due dates related to the publication date.

If (at block 332) the document is indicated as private, then the document manager 24 determines (at block 346) whether the participant indicated to allow public searching of the document (searching by participants not under an obligation of confidentiality to the owner of the document), which is indicated by the participant in the allow public searching graphical element 414 in the document submission page 400 (FIG. 13) and is indicated in the allow search indexing 230 field of the private access options 136 (FIG. 7). If not, control ends. Otherwise, if the participant indicates to allow searching of the private document in the search index 32, then control proceeds to block 350 in FIG. 12c.

If (at block 350) the participant indicated to index document content, as indicated in the index document content 416 graphical element in the document submission page 400, then the search engine 30 or document manager 24 scans (at block 352) the document to determine all words in the document and updates (at block 354) the search index 32 to associate the document identifier of the added document with all the determined words in the document. From the no branch of block 350 or block 354, the document manager 24 determines (at block 356) whether the participant indicated to index the private document. If so, then the search engine 30 or document manager 24 updates (at block 358) the search index 32 to associate the document identifier 122 of the added document with the words in the public description (entered in field 410 of the document submission page 400 (FIG. 13) and saved in field 132 of the document information 122 (FIG. 3)). From the no branch of block 356 or block 358, the document manager 24 determines (at block 360) whether the participant indicated to index added search terms. If so, then the search engine 30 or document manager 24 updates (at block 362) the search index 32 to associate the document identifier 122 of the added document with the added search terms (entered in field 412 of the document submission page 400 (FIG. 13) and saved in field 130 of the document information 122 (FIG. 3). The document manager 24 provides (at block 364) access to participants accessing the search engine 30 to obtain search results associated with the document in the search index 32. The document manager 24 may further cause a transmission over the network 16 of confirmation that the document was added to the document store 8 and, if indexed, confirmation that the document is indexed in the search index 32 as specified (indexed by document content, search terms and/or, public description) and publicly searchable.

With the described embodiments, the owner of a document may only allow indexing of terms from the public description and added search terms for a private document to prevent others from searching for the document based on terms related to the novel, inventive and creative aspects of the document on which intellectual property protection may be based. This would be done to prevent searches from revealing aspects of the document protected by intellectual property laws in a manner that may jeopardize intellectual property rights. Alternatively, the document may be indexed according to the terms of the document under the assumption that the inventive, novel, and creative works in the document will not be revealed by search results returning the document and public information about the document.

Figure 14:
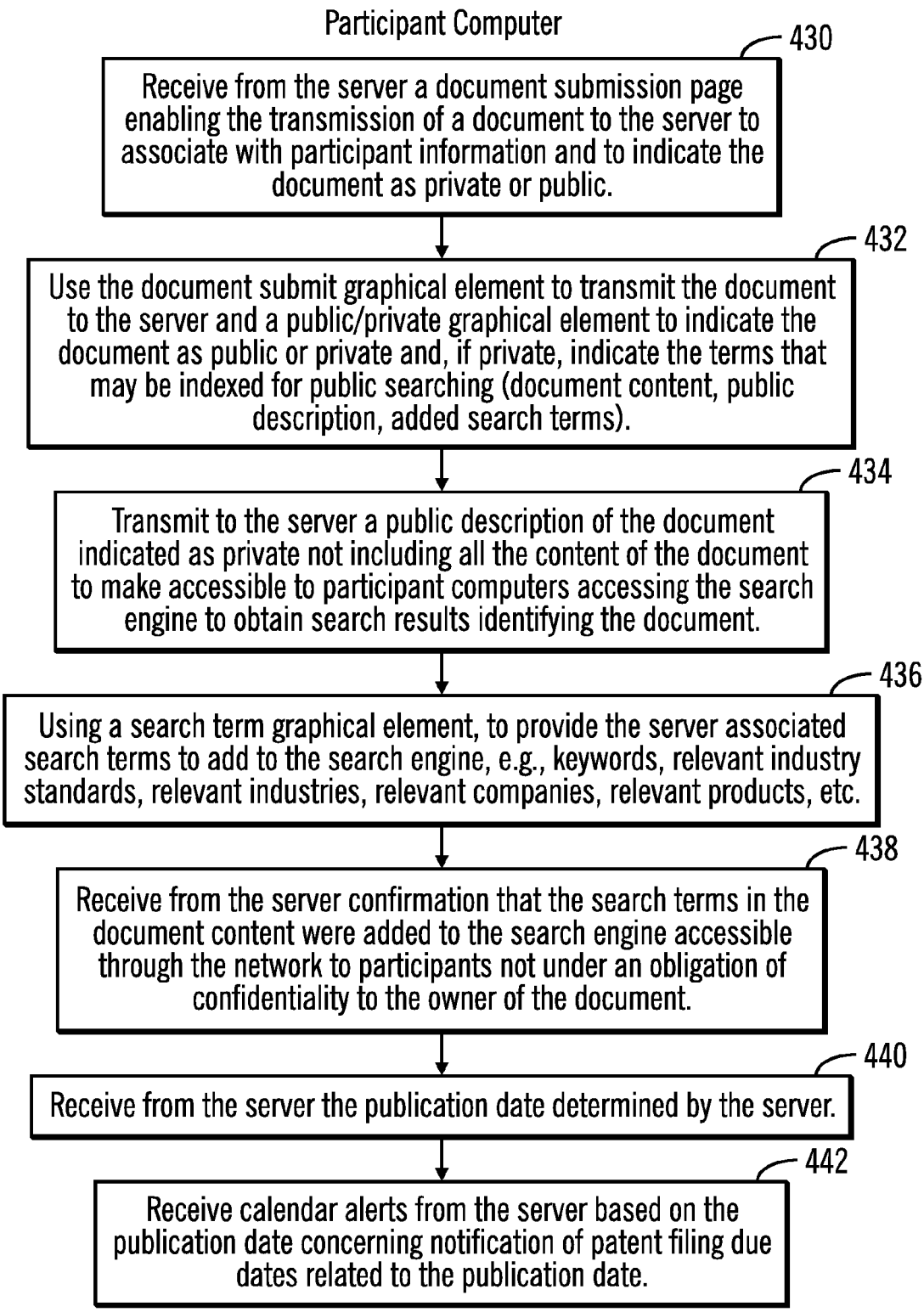
FIG. 14 illustrates an embodiment of operations at a participant computer to process a document submission page for adding a document.

FIG. 14 illustrates an embodiment of operations to submit a document to the online document sharing community performed by the viewer program 18 in the participant computer 12a, 12b . . . 12n operated by a participant and executing code included in the pages received from the server 4. Control begins with the viewer 18 receiving (at block 430) the at least one document submission page 400. The viewer 18 uses (at block 432) the document submit graphical element 422 to transmit the document to the server and the private 406 and public 408 graphical elements to indicate the document as public or private. If the document is private, the submission of the document may further indicate, using graphical elements 416, 418, and 420, the terms that may be indexed for public searching (e.g., document content, public abstract, added search terms). The viewer 18 may use (at block 434) the graphical element 410 to enter and transmit to the server 4 a public description of the document indicated as private not including all the content of the document to make accessible to participants accessing the search engine to obtain search results identifying the document. The provided public description 132 may exclude key subject matter, such as the patentable, copyrightable or trade secret protected subject matter. The viewer program 18 may then be controlled by the participant to use (at block 436) the add search term graphical element 412 to provide the server 4 associated search terms 130 to add to the search index 32 of the search engine 30, e.g., keywords; relevant industry standards, relevant industries, relevant companies, and relevant products. The viewer program 18 may receive (at block 438) from the server 4 confirmation that the search terms in the document content were added to the search index accessible through the network to computer participants not under an obligation of confidentiality to a owner of the document. If the document is public, the viewer 18 would further receive (at block 440) from the server the publication date 140 as determined and verified by the server 4. The viewer 18 may further receive (at block 442) calendar alerts from the server 4 based on the publication date concerning notification of patent filing due dates related to the publication date.

In certain embodiments, the viewer 18 used by a registered or unregistered participant may transmit a request to the server 2 for a search result page for documents maintained in the document store 8. The search request criteria may request all documents having publication dates 140 within one year of a current date to determine documents that still may be eligible for patent protection in the United States. The search engine 30 may then use the search index 32 to search for documents satisfying the search request criteria and return a search result page indicating a description of documents satisfying the search request criteria, wherein the descriptions of the documents generated in the search result page include links to the content of the documents and the publication dates 140 of the documents indicating indicate dates the search engine made the content of the documents publicly available to participants of the online document sharing community not under an obligation of confidentiality to owners of the documents with respect to the document. The document information presented in the search results page may indicate whether an application has been filed related to the content of the document. The viewer program 18 may then select from the search results pages the links to the documents to request the document content.

Figure 15:
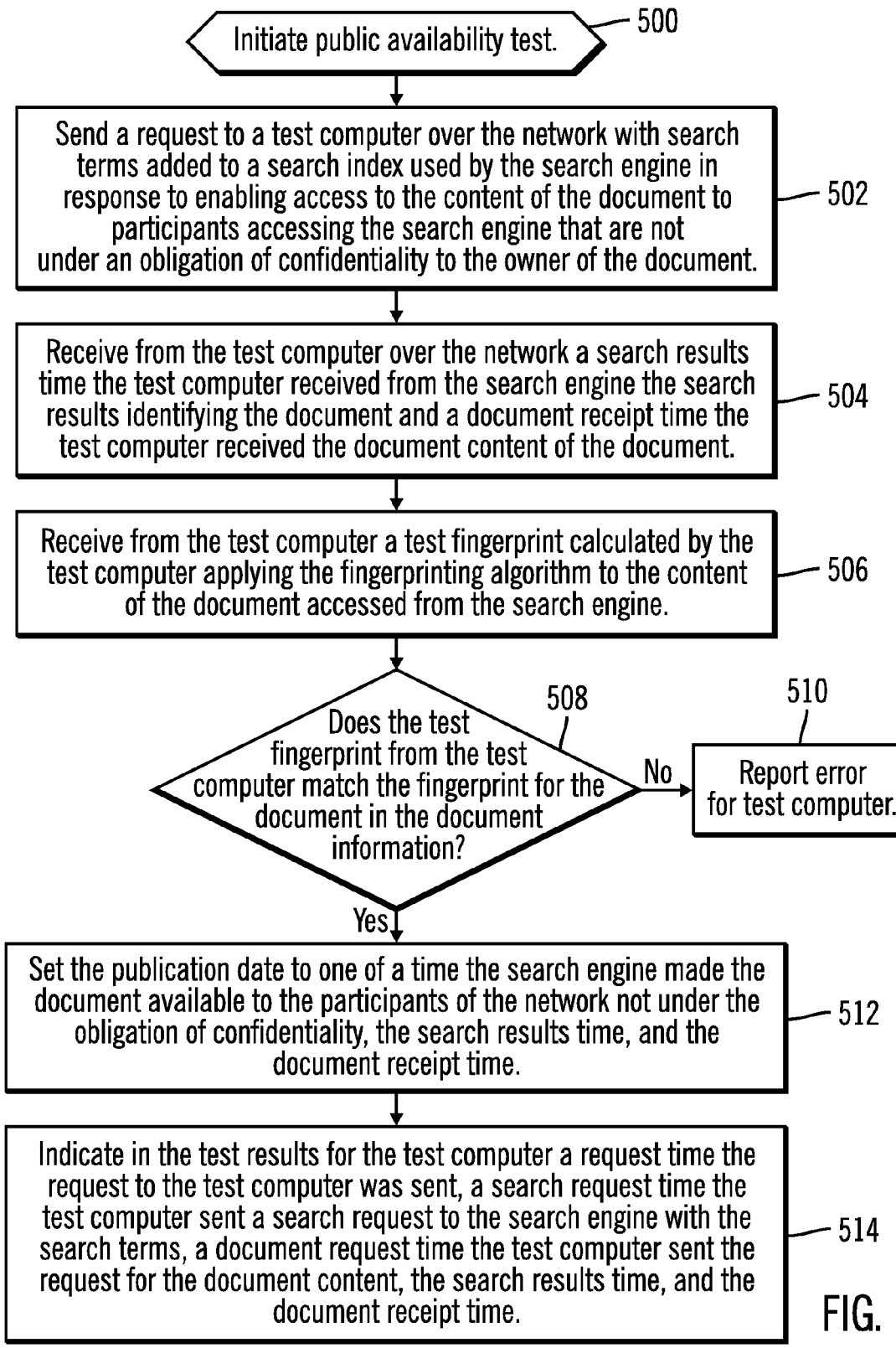
FIG. 15 illustrates an embodiment of operations to test the public availability of a document added to the search index.

FIG. 15 illustrates an embodiment of operations performed by the document manager 24 to determine and validate whether a document added to the search index 32 is in fact publicly available to participants accessing the search engine 30 over the network 16 that are not under an obligation of confidentiality with respect to the document. Upon initiating (at block 500) the public availability test for a document 14 being added to the search index 32, the document manager 24 sends (at block 502) a request to a test computer 46 over the network 16 with search terms added to the search index 32 used by the search engine 30 in response to enabling access (at block 338 in FIG. 12b) to the content of the document to participants accessing the search engine 30 that are not under an obligation of confidentiality to the owner of the document with respect to the document whose public availability is being tested. The document manager 24 receives (at block 504) from the test computer 46 over the network 16 a search results time the test computer received from the search engine 30 the search results identifying the document and a document receipt time the test computer received the document content of the document after accessing the content of the document through the received search results. This document receipt time indicates a latest time the document was publicly available. The document manger 24 further receives (at block 506) from the test computer 46 a test fingerprint calculated by the test computer applying the fingerprinting algorithm to the content of the document accessed from the search engine 30. The server 4 and test computers 46 use the same fingerprinting algorithm, so the same fingerprint is produced if the identical document is processed fingerprinted.

If (at block 508) the test fingerprint from the test computer matches the fingerprint 124 for the document in the document information 120 (FIG. 3), then the document manager 24 sets (at block 512) the publication date 140 to one of a time the search engine 30 made the document available to the participants of the network not under the obligation of confidentiality, the search results time, and the document receipt time. One of these times may be selected to use as the publication time 140 based on preferences of the server 4 administrator or the owner of the document. The document manger 24 may further indicate (at block 514) in test results 280 (FIG. 10) for the test computer, identified by the test computer ID 282a . . . 282n, the access results 284a . . . 284n, which may include a sent request time 290 the request to the test computer was sent, a search request time 292 the test computer 46 sent a search request to the search engine with the search terms, a document request time 294 the test computer sent the request for the document content, the search results time 296, the document receipt time 298 the document was received at the test computer, and the test fingerprint 300 comprising the fingerprint the test computer 282a . . . 282n calculated from the document using the same fingerprint algorithm the server 4 uses to calculate the fingerprint 124 for the document in the document information 120 (FIG. 11). If (at block 508) the test fingerprint and fingerprint 124 do not match, then an error is thrown (at block 510).

With the described embodiments of FIG. 15, the server 4 may capture information on when the document was made publicly available in the search engine 30 that may be used later by the document owner as evidence of the public availability of the document if such evidence is needed to establish a priority date of invention or a date the document may be considered as prior art under patent laws of the United States and other countries. The use of the fingerprint provides further evidence that the public availability access results 284a . . . 284n are generated for a specific document identified by a unique fingerprint 124. Such additional identifying evidence may assist in proving in a court of law the date the document was made publicly available.

Figure 16:
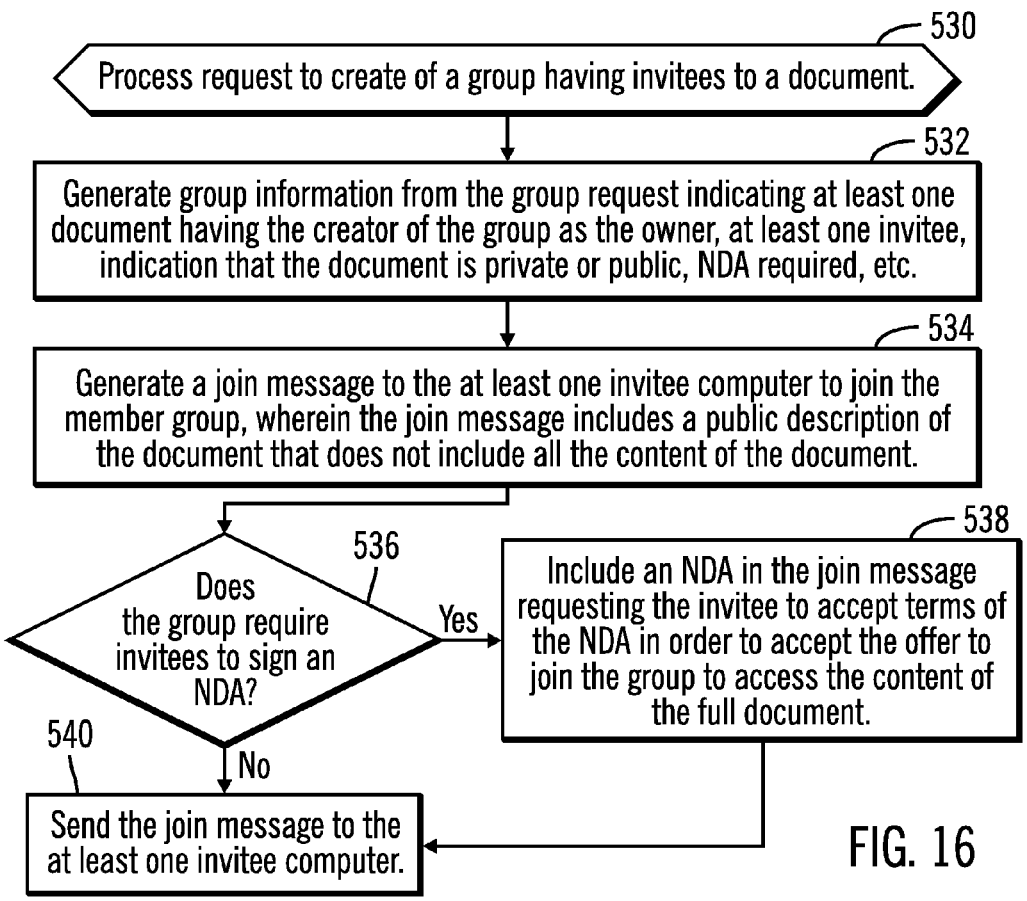
FIG. 16 illustrates an embodiment of operations to create a group for a document.

FIG. 16 illustrates an embodiment of operations to process a request to create a group 260 (FIG. 9) associated with one or more documents from the owner of the documents 14 performed by a component of the manager 20, such as the account manger 28. The request to create the group 260 may include indication as to whether the group is public or private 266, invitees 268, one or more documents 272, and indication 274 whether acceptance of terms of a non-disclosure agreement (NDA) is required by each invitee in order to access the one or more documents 272 associated with the group 260. Upon processing (at block 530) the request to create the group, the manager 20 creates (at block 532) group information 280 (FIG. 9) from the request indicating the group owner 264 as the registered participant that initiated the request to create the group; the public/private flag 266; invitee IDs 268; initializes the member IDs 270 to empty; at least one or more document IDs 272 assigned to the group (where only documents in which the participant creating the group is the owner may be included in the group); indication of whether an NDA is required 274; and optionally the NDA content 276. The NDA content 276 may comprise a default NDA provided by the manager 20, may comprise one of multiple NDA agreements provided by the manager 20 that are selected by the owner of the group or may comprise an NDA provided by the owner of the group. If the owner does not provide an NDA, then a default NDA may be used. The manager 20 may provide different NDAs for different type of content, such as an NDA tailored to a utility invention subject to patent laws, an NDA tailored to a screenplay, novel subject to copyright laws, etc.

The manager 20 may generate (at block 534) one or more join messages to the at least one invitee to join the member group, wherein the join message includes a public description of the document that does not include all the content of the document, such as the title 128 and public access information 142 and/or public description 132. If (at block 536) the group requires an NDA to access the at least one document 272, then the manager 20 includes (at block 538) NDA 276 content in the join message requesting the invitee to accept terms of the NDA in order to accept the offer to join the group to access the full content of the document. From block 538 or if an NDA is not required, the join message is sent (at block 540) to the at least one invitee. The join message may be sent via email, text message, web browser, social media web site (e.g., TWIT- TER®, FACEBOOK®, etc.) to the invitee. (TWITTER is a registered trademark of Twitter Inc. and FACEBOOK is a registered trademark if Facebook, Inc.)

Figure 17:
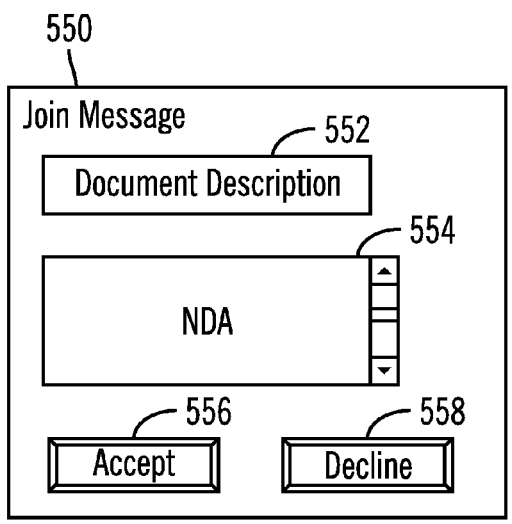
FIG. 17 illustrates an embodiment of a join message for a group.

FIG. 17 illustrates an embodiment of a join message 550 as including a document description 552, such as the title 128, public description 132, public access info 142, the owner/participant providing the document, and an NDA 554, such as included in the NDA content 276, along with an accept graphical element 556 and a decline graphical element 558 enabling the invitee receiving the join message 550 to accept or not accept (decline) the terms of the NDA 540. The accept graphical element 556 causes the viewer 18 to generate an accept message to the server 4 indicating agreement to accept the terms of the NDA to join the group. The invitee is only allowed to access the content of the document associated with the group after selecting the accept graphical element 556 indicating acceptance of the NDA terms.

The document description 552 may not include all the content of the document, and may only include general information on the nature or field of the content of the document. The document description 552 may exclude description of elements of the invention, creative work, artistic work, intellectual work, and original material as described in the document that may form the basis of patent, copyright or other intellectual property protection.

In certain embodiments, the manager 20 may require authentication of the participant accepting the terms of the NDA to authenticate the identity of the participant before content of a document is made available to the participant. For instance, upon accepting the NDA, the manager 20 may require biometric data, answer to authentication questions, etc. to authenticate the participant accepting the NDA. Alternatively, the authentication may involve the owner of the document contacting the accepting invitee to verify that the invitee is in fact accepting the terms of the NDA to access the document description.

Figure 18:
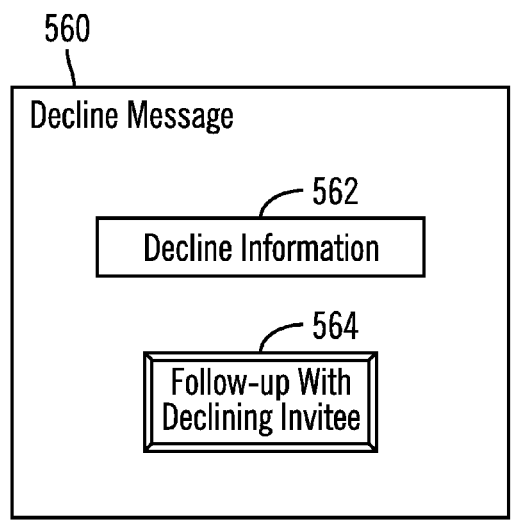
FIG. 18 illustrates an embodiment of a decline message for a group.

FIG. 18 illustrates an embodiment of an owner decline message 560 sent by the manager 20 to the owner of a group when an invitee selects the decline graphical element 558. The owner decline message 560 includes decline information 562 which may identify the invitee that selected the decline graphical element 558, information on the group, and a follow-up with declining invitee graphical element 564 enabling the owner of the group to communicate with the declining invitee, such as by requesting the declining invitee to communicate with the owner of the group or by providing the declining invitee access to the document without requiring the NDA. The decline information 562 may further indicate the document that the invitee declined. If the group is associated with multiple documents and the invitee selected to accept the NDA with respect to certain of the documents in the group and not others, then the owner decline message 560 is only generated for those documents for which the invitee selected to decline the NDA.

In one embodiment, the accept 556 and decline 558 graphical elements may be associated with code embedded in the join message 550 that when executed by the participant viewer 18 executing in the participant computer 12a, 12b . . . 12n causes the transmission of an NDA accept message 550 or decline message 560 (FIG. 18) to the server 4 to forward to the group owner 264 of the at least one document 272 indicating that the invitee accepted or declined the NDA of the document.

In further embodiments, the join message 550 may include graphical elements to allow the invitee to accept and decline the NDA with respect to specific documents associated with the group. In such case, the group information 260 would maintain for each member 270 of the group indication of those documents for which the NDA was declined or accessed, so that a group member is only allowed access to the documents for which they accepted the NDA.

Figure 19:
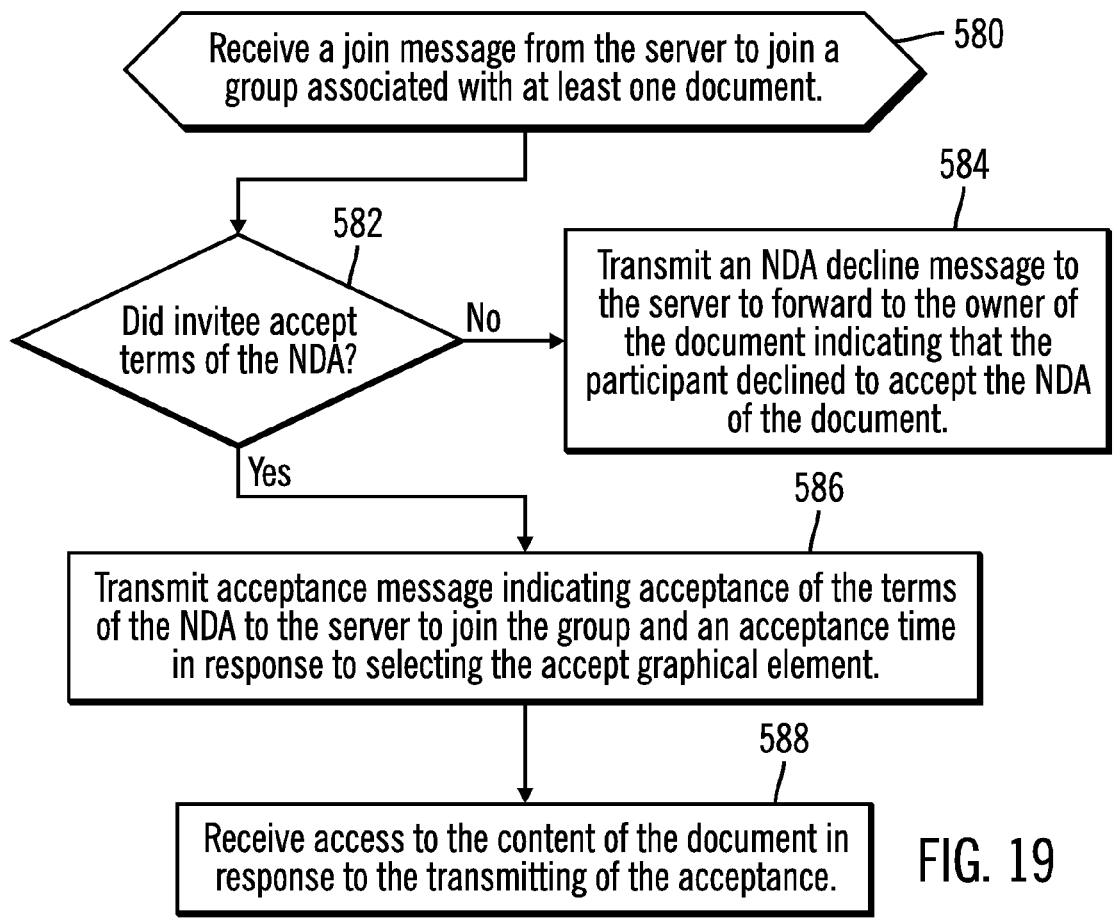
FIG. 19 illustrates an embodiment of operations for a participant computer to process a join message to join a group.

FIG. 19 illustrates an embodiment of operations performed by the viewer 18 upon processing the code and content within a received join message 550 (FIG. 17) for a participant comprising an invitee to the group associated with the received the join message. Upon receiving the join message 550 (at block 580) from the server 4 to join a group 280 associated with at least one document 272, if (at block 582) the invitee does not accept the terms of the displayed NDA 554 by interactively selecting the decline graphical element 556, then the viewer program 18 transmits (at block 584) an NDA decline message to the server 4 to cause the server 4 to forward to the owner of the document an owner NDA decline message 560 (FIG. 18) indicating that the participant declined to accept the NDA of the document. If (at block 582) the participant selected the accept graphical element 556, then the viewer 18 transmits (at block 586) an acceptance message indicating acceptance of the terms of the NDA to the server 4 to join the group and a time/date the acceptance was made. The viewer 18 may then after transmitting acceptance receive (at block 588) access to the full content of the at least one document for which the terms of the NDA were accepted. As mentioned, additional authentication of the invitee may be performed by the manager 20 or the owner of the document of an invitee accepting the NDA to authenticate the identity of the accepting NDA.

Figure 20:
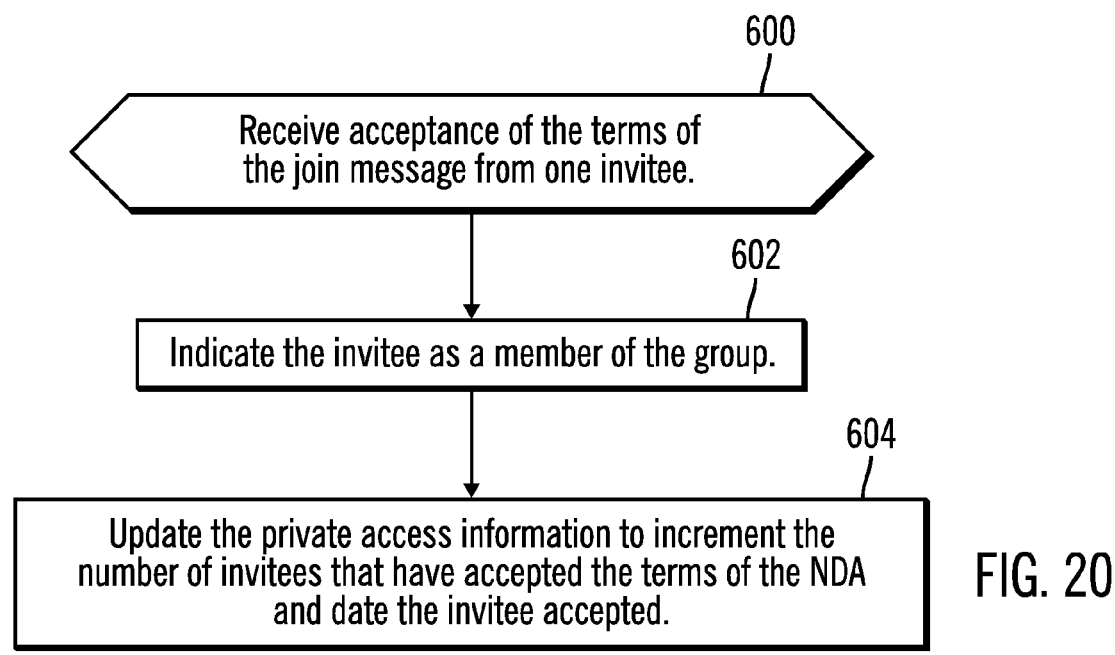
FIG. 20 illustrates an embodiment of operations to process acceptance of the terms of a join message from an invitee.

FIG. 20 illustrates an embodiment of operations performed by a component of the manager 20, such as the account manager 28 managing the groups, to process an acceptance of the terms of a join message 550 from an invitee. Upon receiving (at block 600) acceptance of the terms of the join message 550 from one invitee 268, which acceptance message is transmitted at block 586 (FIG. 19), the manager 20 indicates (at block 602) the invitee sending the acceptance message as a member of the group in response to receiving the accept message from the invitee. In certain embodiments, access to the document is only provided to those invitees that have joined the group by selecting the accept graphical element 556 to send the accept message. The manager 20 further may update (at block 604) the private access information 190 to increment the number of NDA acceptances 198 and indicate in the NDA acceptances 200 the time/date the invitee accepted, which is communicated in the acceptance message.

Figures 21, 22:
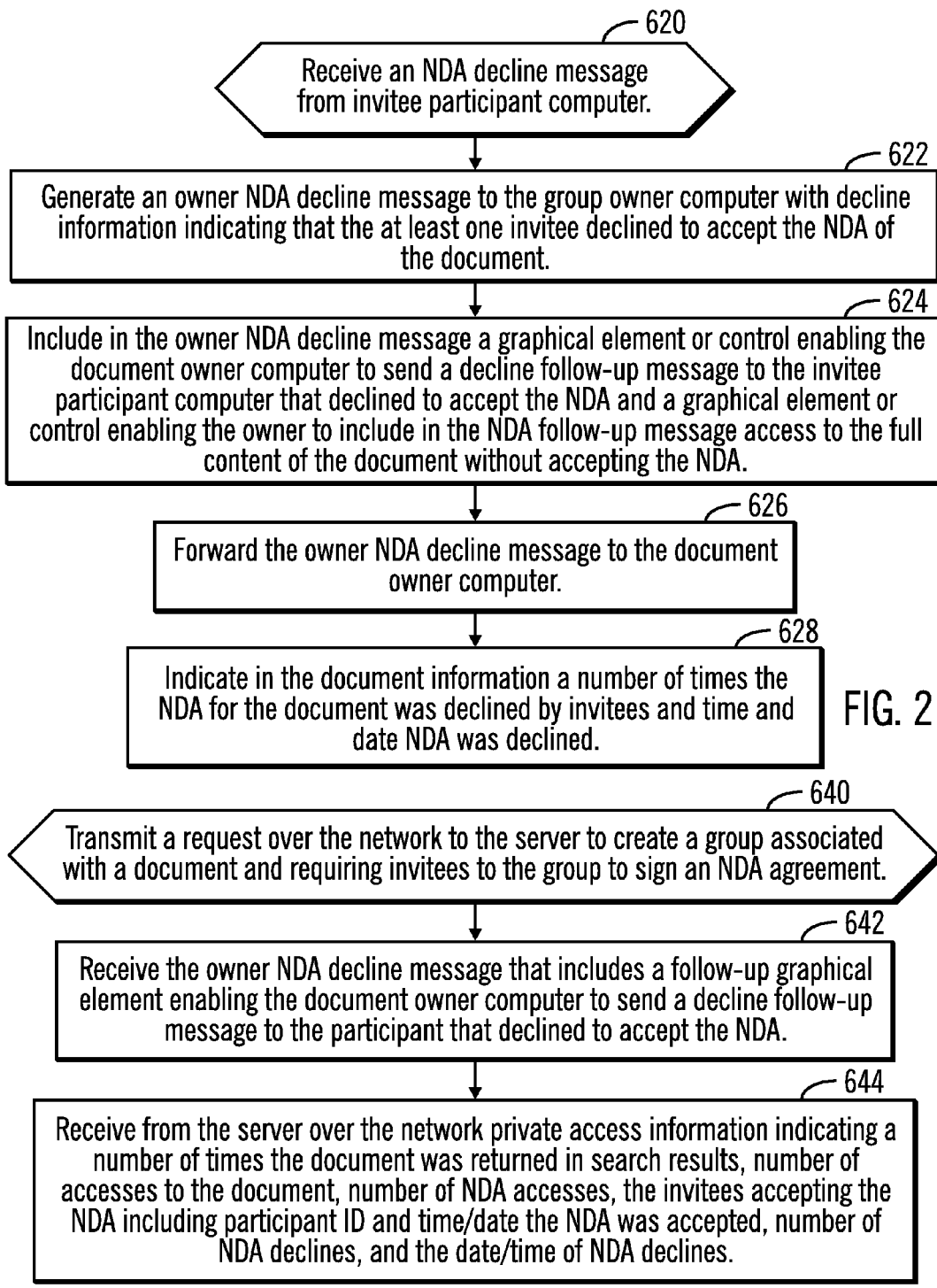
FIG. 21 illustrates an embodiment of operations to process an NDA decline message from an invitee.
FIG. 22 illustrates an embodiment of operations related to processing for a group associated with a document.

FIG. 21 illustrates an embodiment of operations performed by a component of the manager 20, such as the account manager 28 managing the groups, to process an NDA decline message 560 from an invitee participant computer. Upon receiving (at block 620) an NDA decline message from an invitee participant computer 12a, 12bb . . . 12n, the document sharing component 20 generates (at block 622) an owner NDA decline message 560 to the owner of the group document including decline information 562 indicating that the at least one invitee participant declined to accept the NDA of the document. Further, for groups associated with multiple documents, one or more owner NDA decline messages 560 may be provided to the owner of the group for those documents the invitee declined the NDA and not the documents for which the invitee accepted the NDA. The owner NDA decline message 560 may include (at block 624) a follow-up graphical element or control 564 enabling the owner of the document receiving the owner NDA decline message 560 to send an NDA decline follow-up message to the invitee that declined to accept the NDA and a graphical element or control enabling the owner to include in the follow-up message access to the full content of the document without accepting the NDA, such as the content itself or a hypertext link to the content. The follow-up message may request that the invitee contact the owner to further discuss the document through messages maintained in the message store 42, or include the graphical element allowing access without NDA acceptance terms should the owner of the document decide to waive the requirements of the NDA due to the perceived importance of the particular invitee. The owner NDA decline message is then forwarded (at block 626) to the owner of the document that created the group. The document manager 24 may indicate (at block 628) in the document information 120 a number of times 202 the NDA for the document was declined (FIG. 6) by invitees/requesting computers and the declining participant ID and time declined in the field 204 of the private access information 190 for the requested document.

FIG. 22 illustrates an embodiment of operations performed by the viewer program 18, in an owner computer, comprising one of the participant computers 12a, 12b . . . 12n, used by the owner creating the group. At block 640, the viewer program 18 used by the group owner transmits (at block 640) a request over the network 16 to the server 4 to create a group associated with a document and requiring invitees to the group to sign an NDA agreement. The transmission at block 640 invokes the operations of FIG. 16 performed by the server 4 to create the group 260. At block 642, the owner computer receives the owner NDA decline message 560 that includes a follow-up graphical element 564 (FIG. 18) enabling the owner of the document to send an NDA decline follow-up message to the invitee participant computer that declined to accept the NDA. The owner computer 12a, 12b . . . 12n creating the group may further receive (at block 644) from the server 4 over the network 16 private access information 190 (FIG. 6) indicating a number of times the document was returned in search results 194, number of participant accesses 196 to the document, number of NDA accesses 198, number of NDA acceptances 200, including the participant ID and time/date the NDA was accepted, a number of NDA declines 202, and declining participants IDs and the date/time of the NDA declines 204.

With the embodiments described with respect to FIGS. 16-22, a participant in the online document sharing community may create a group associated with one or more documents. If the group is private, then a join message sent to the invitees may require they accept the NDA in order to access the full content of the one or more documents associated with the group. Further, information on the invitees that have declined and accepted the NDA may be provided to the owner of the group, as well as the capability for the owner of the group to follow up with any declining invitees to inquire about their decision to decline the NDA and to allow the owner to provide access to the document without requesting the NDA, thereby overriding the NDA and its legal effect.

Figure 23:
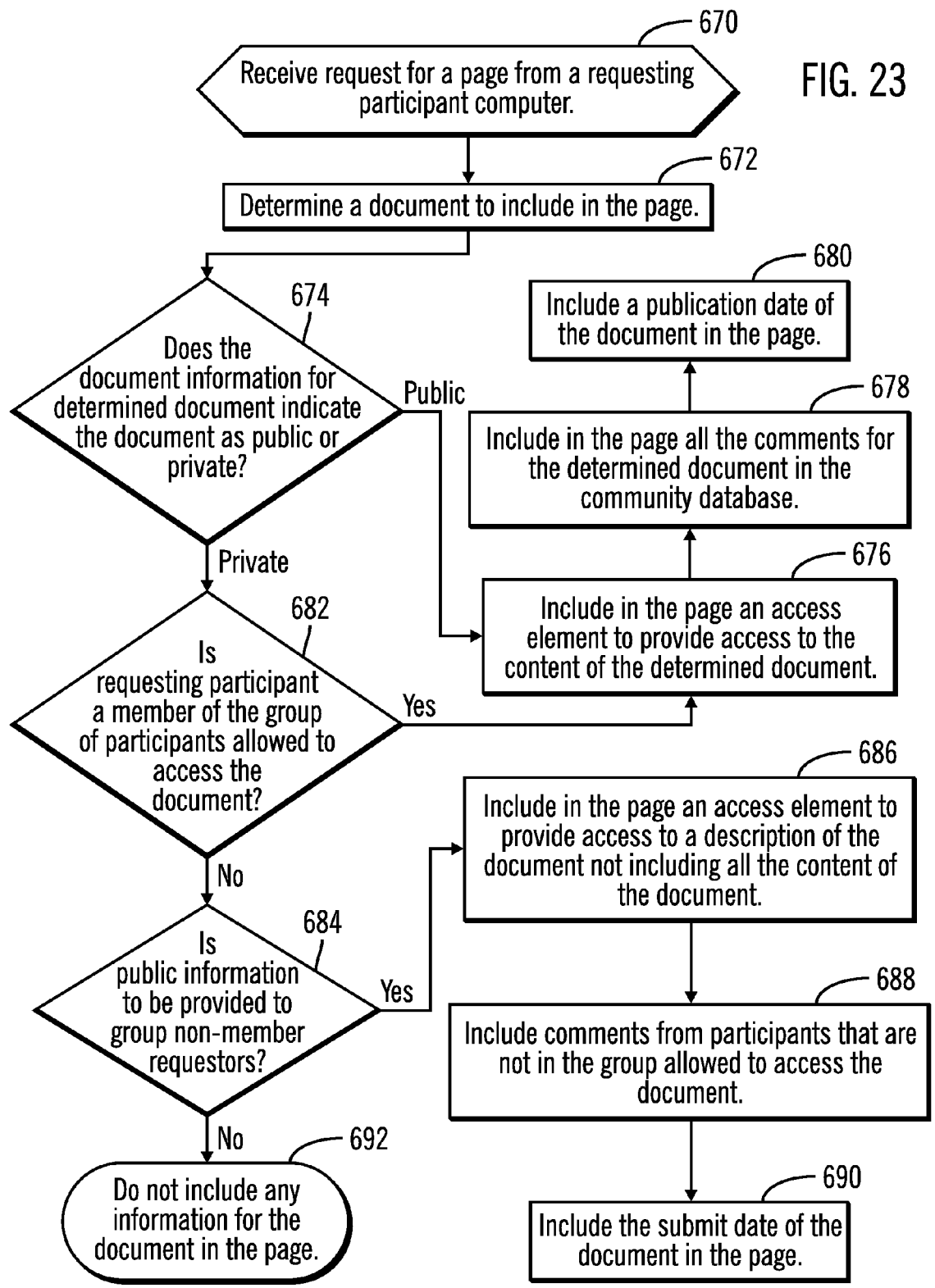
FIG. 23 illustrates an embodiment of operations to process a request for a page from a requesting participant.

FIG. 23 illustrates an embodiment of operations performed by a component of the manager 20, such as the request handler 22, document manager 24, etc., to receive a request for a page from a requesting participant. Upon receiving (at block 670) a request for a page with information on documents 14, a determination is made (at block 672) of documents to include in the requested page. For instance, if the page request includes a search criteria or document identifying criteria, then the documents to identify in the requested page may comprise documents 14 satisfying the specified search criteria or identified by the document identifying criteria. The manager 20 determines (at block 674) whether the document information 120 for the document to include indicates the document is public or private, such as from the flag 134 (FIG. 3). If (at block 674) the document is public, then access (such as the content itself or an access element, e.g., hypertext link, etc.), is included (at block 676) in the page to provide access to the content of the determined document. The manager 20 may further include all the comments (at block 678) for the determined document in the comment database 44 as well as the publication date 140 (at block 680).

If (at block 674) the document is private, then a determination is made (at block 682) whether the requesting participant is a member of a group 260 of participants allowed to access the document. If so, control proceeds to block 676 to include access to the document (such as the document content access elements in the page) to enable access to the content of the document to the requesting participant. If (at block 682) the requesting participant is not a member of the group associated with the determined document, then a determination is made (at block 684) as to whether public information to be provided to group non-member requestors, which may be indicated in the provide public info field 228 of the private access operations 136. If public information is to be provided, then the manager 20 includes (at block 686) in the page an access element to provide access to a public description of the document not including all the content of the document, such as excluding the content for which intellectual property protection is available. The manager 20 may further include (at block 688) in the page comments for the document from participants that are not members of the group allowed access to the document, and the submit date 138 of the document may also be included. If (at block 684) public information is not to be provided to non-member requesting participants, then no information on the document is included (at block 692) in the page to return to the requesting participant computer 12a, 12b . . . 12n.

With the operations of FIG. 23, the page returned to the requesting participant may determine the information about the document and comments based on whether the document is private or public, and, if private, whether the requesting participant is a member of the group of participants allowed to access the documents. The operations of FIG. 23 ensure that only members of the group allowed to access all the content of the document may receive comments from the other members of the group that have access to all the content. Further, requesting participants that are not members of the group may receive public information on a private document, which excludes the content subject to intellectual property protection, and receive comments from other participants commenting on the document that are not members of the group and would also not have access to all the content. The described embodiments thus provide a technique for making comments from different sets of participants available to requesting participants requesting a document based on the status of the document, public or private, and whether the requesting participant is a member of the group allowed access to all the document content. The operations of FIG. 23 prevent a participant that is not a member of the group of the private document from learning about the protected content through the comments from members of the group that have access to the full content of the document.

Figure 24A:
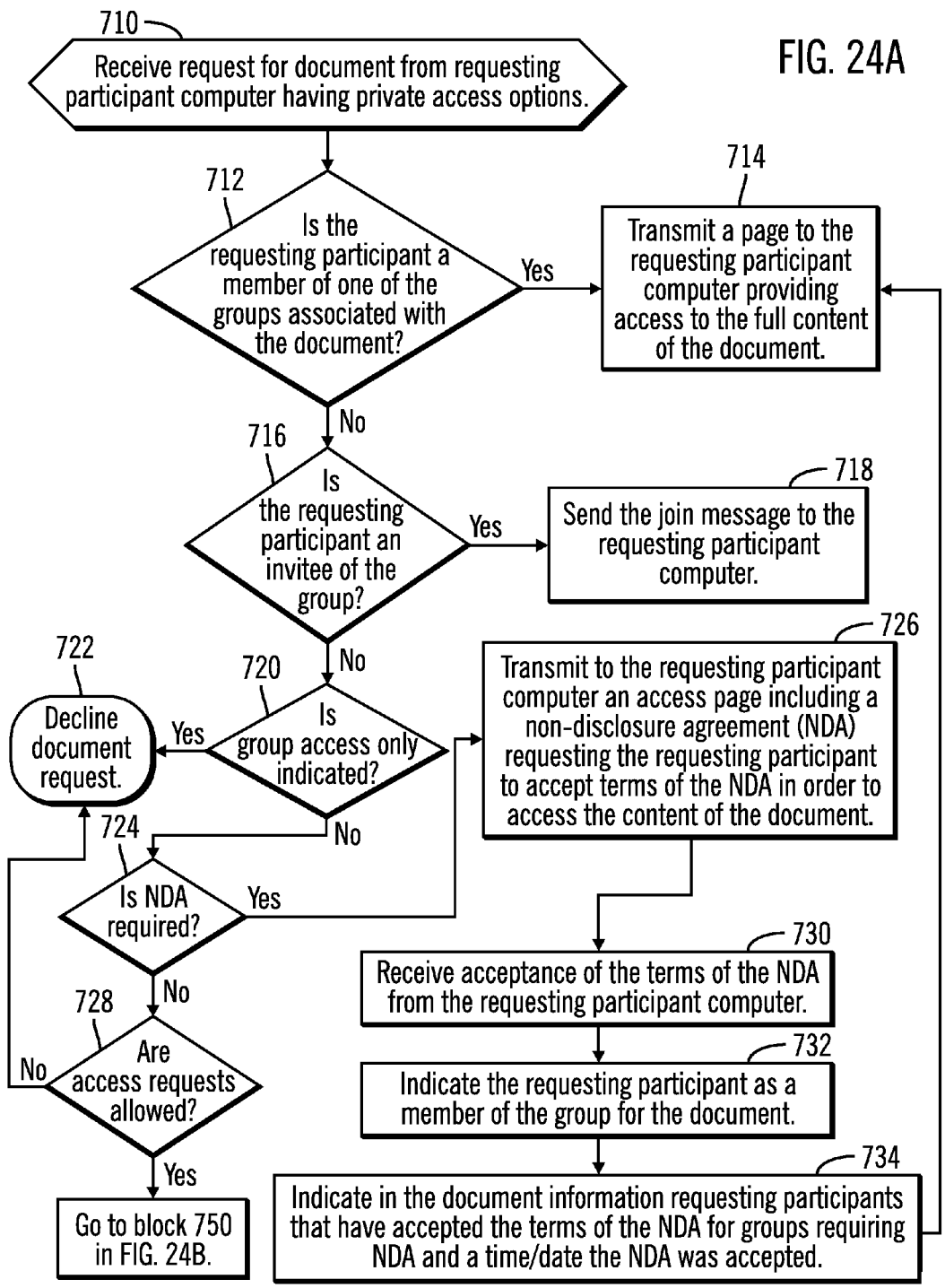
FIGS. 24a and 24b illustrates an embodiment of operation to process a request for a document having private access options.
Figure 24B:
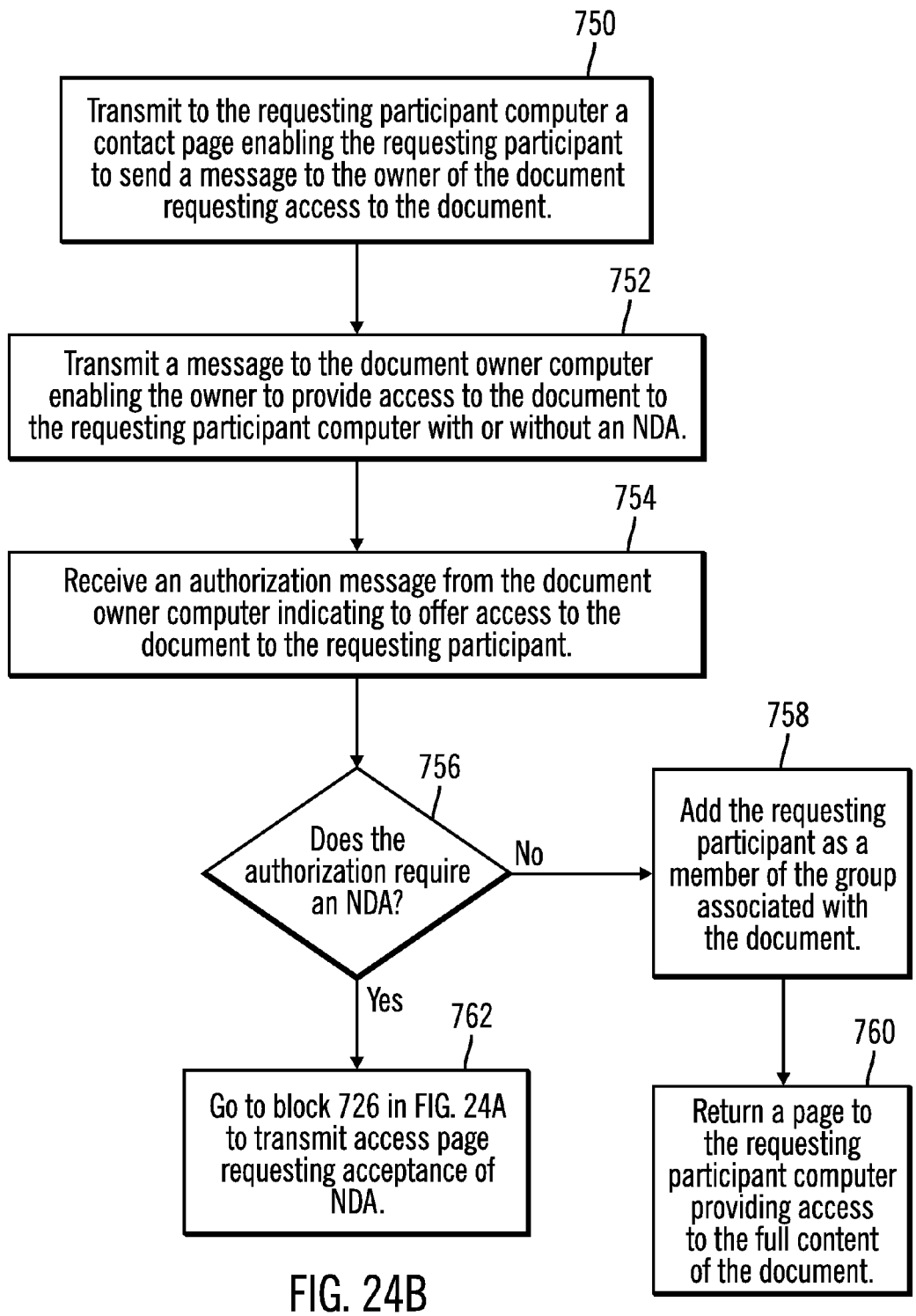

FIGS. 24a and 24b illustrate an embodiment of operations performed by a component of the manager 20, such as the request handler 22, document manager 24, etc., to process a request for a document from a requesting participant computer 12a, 12b . . . 12n having private access operations. Upon receiving (at block 710) the document request from a requesting participant, a determination is made (at block 712) if the requesting participant is a member of one of the groups 260 associated with the document, such as the one or more groups 260 identifying the requested document in the document field 272 (FIG. 9). If (at block 712) the requesting participant is a member of the group associated with the document, then a page is transmitted (at block 714) to the requesting participant computer providing access to the full content of the document, such as by including the document content, a link to the document content, etc. If (at block 712) the requesting participant is not a member of one of the determined groups 260 associated with the document, then if (at block 716) the requesting participant is an invitee of the group, as indicated in field 268, then the join message 550 (FIG. 17) is sent (at block 718) to the requesting participant requesting to join the group.

If (at block 718) the requesting participant is not an invitee of the group, then if (at block 720) group access only is indicated for the requested document in field 226, indicating that only members of the group may access the document, then the document request is declined (at block 722). If (at block 720) the group access only field 226 indicates that participants not members of the group may be eligible to access the document and if (at block 724) the NDA access required 274 field indicates that an NDA is required to access the documents for the group, then the manager 20 transmits (at block 726) to the requesting participant computer an access page including a non-disclosure agreement (NDA) requesting the requesting participant to accept terms of the NDA in order to be provided access to the content of the document. Upon receiving (at block 730) an acceptance of the terms of the NDA from the requesting participant, the requesting participant is indicated (at block 732) as a member 270 of the group. Indication is made (at block 734) in the NDA acceptances 200 (of the private access information 144 of the document information 120) the participant IDs of participants that have accepted the NDA and times/dates the NDA was accepted by the participants.

If (at block 724) an NDA is not required and access requests to the owner are allowed (at block 728), as indicated in field 222 of the private access options 136, then control proceeds to block 750 in FIG. 24b to transmit to the requesting participant computer a contact page enabling the requesting participant to send a message to the owner of the document requesting access to the document.

The manager 20 transmits (at block 752) a message to the document owner computer enabling the owner to provide access to the document to the requesting participant with or without an NDA. Upon receiving (at block 754) an authorization message from the document owner to offer access to the requesting participant, if (at block 756) the authorization does not require an NDA, then the manager 20 adds (at block 758) the requesting participant as a member of the group 260 associated with the document. If (at block 756) the authorization requires an NDA, then control proceeds to block 726 in FIG. 24a to transmit the access page to the requesting participant computer requesting acceptance of the NDA to access the document. If (at block 756) the authorization does not require an NDA to access, then the manager 20 adds (at block 758) the requesting participant as a member 270 of the group 260 associated with the document and a page is returned (at block 760) to the requesting participant computer 12a, 12b . . . 12n providing access to the full content of the document, such as by providing the content or a link to the full content.

Figure 25:
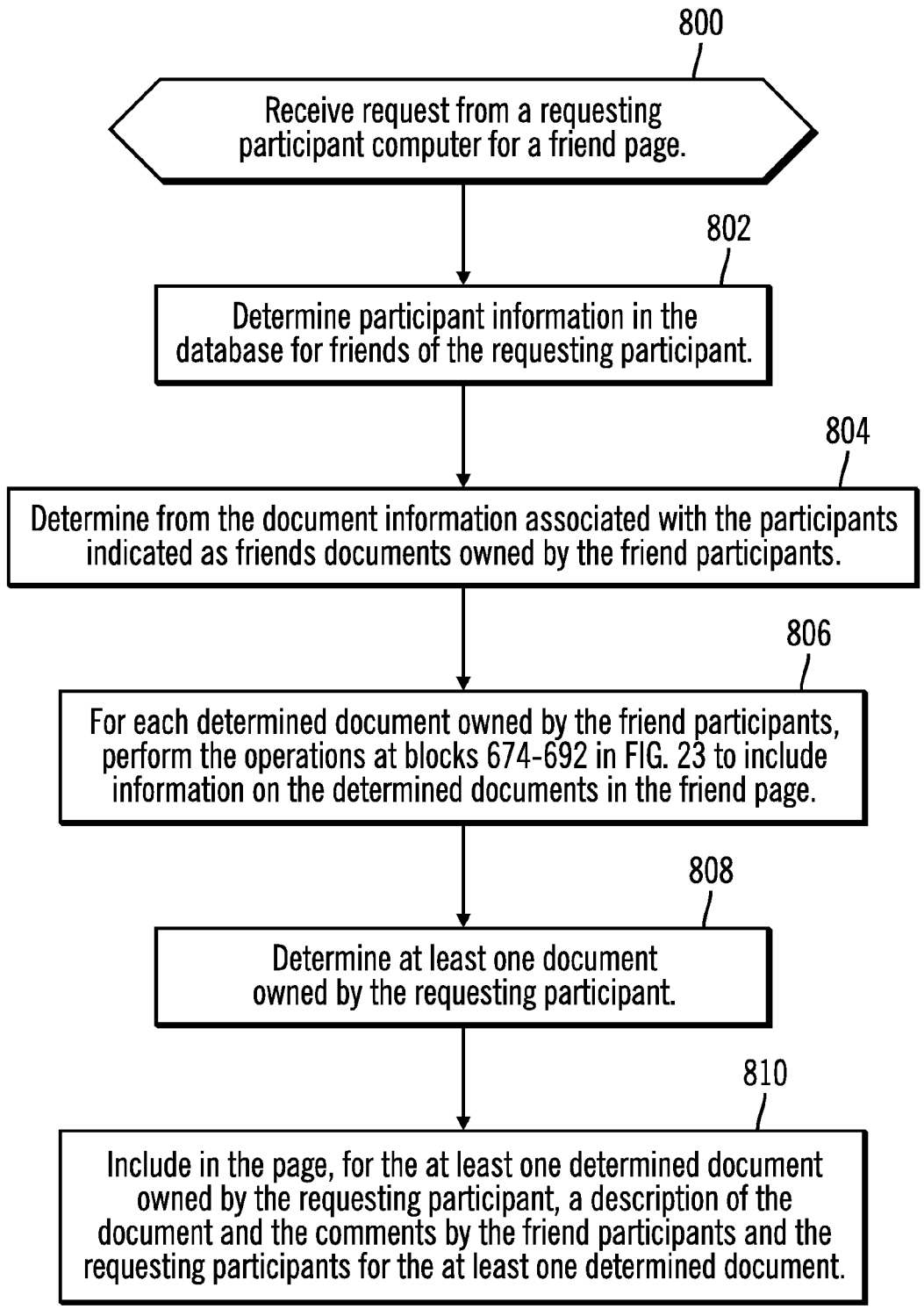
FIG. 25 illustrates an embodiment of operations to process a request for a friend page.

FIG. 25 illustrates an embodiment of operations performed by one or more components of the manager 20, such as the request handler 22, document manager 24, etc., to process a request for a friend page from a requesting participant computer 12a, 12b . . . 12n. Upon receiving (at block 800) the request, the manager 20 determines (at block 802) participant information in the database 34 for friends of the requesting participant, which may be indicated in the friends field 60 of the participant information 50 for the requesting participant. A determination is made (at block 804) from the document information 120 associated with the participants indicated as friends documents owned by the friend participants. The document information 120 may be for documents for which the determined friends are the owner. For each determined document owned by the friend participants, the manager 20 may perform (at block 806) the operations at blocks 674 through 692 in FIG. 23 to include information and links to the determined documents in the friend page. The manager 20 may further determine (at block 808) at least one document owned by the requesting participant to include in the friend page. The manager 20 may include in the page, for the at least one determined document owned by the requesting participant, a description of the document and the comments by the friend participants and the requesting participants for the at least one determined document.

With the operations of FIG. 25, the document sharing manager may create a page for a requesting participant having information on documents owned by friends of the requesting participant and the requesting participant documents including comments to allow the requesting participant to engage in conversation about their own and friends' documents. This allows a private group of inventors or artists to share their work the friends page to receive meaningful comments from a select group of participants to allow them to more fully develop the inventions and creative content described in their documents.

Described embodiments provide an online document sharing community that allows participants to share creative and inventive subject matter and control the sharing of their intellectual property described in documents to preserve intellectual property rights and, for inventions, establish a prior art date that may be used under the patent laws. Further, participants may present their intellectual property in a public forum through the online document sharing community in order to increase commercial and investor interest.

CONCLUSION

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise a device of storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. Those skilled in the art will recognize that many modifications may be made to this configuration without departing from the scope of the present invention, and that the article of manufacture may comprise suitable information bearing medium known in the art.

Figure 26:
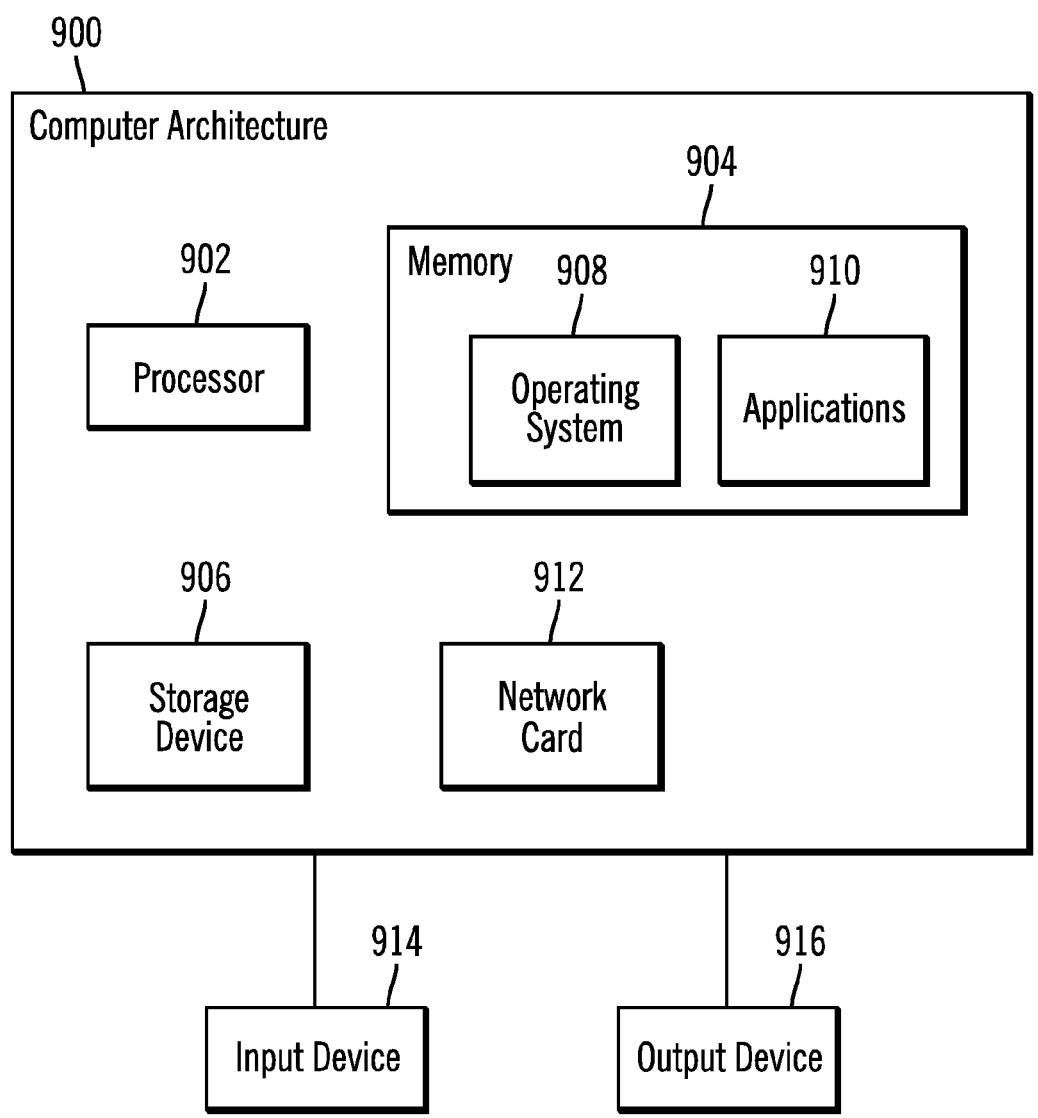
FIG. 26 illustrates an embodiment of a computer architecture in which computer embodiments may be implemented.

FIG. 26 illustrates an implementation of a computer architecture 900 that may be implemented at the server 4, the participant computers 12a, 12b . . . 12n and the test computers 46. The architecture 900 may include a processor 902 (e.g., one or more microprocessors and cores), a memory 904 (e.g., a volatile memory device), and storage 906 (e.g., a non-volatile storage, such as magnetic disk drives, solid state devices (SSDs), optical disk drives, a tape drive, etc.). The storage 906 may comprise an internal storage device or an attached or network accessible storage. Programs, including an operating system 908 and applications 910 stored in the storage 906 are loaded into the memory 904 and executed by the processor 902. The applications 910 may include the described manager 20 its components 22, 24, 26, 28, 30, and 32 and other program components described above. The architecture 900 further includes a network card 912 to enable communication with the network 16. An input device 914 is used to provide user input to the processor 902, and may include a keyboard, mouse, pen-stylus, microphone, touch sensitive display screen, or any other activation or input mechanism known in the art. An output device 916, such as a display monitor, printer, storage, etc., is capable of rendering information transmitted from a graphics card or other component. The output device 916 may render the GUIs described with respect to figures and the input device 914 may be used to interact with the graphical controls and elements in the GUIs described above. The architecture 900 may be implemented in any number of computing devices, such as a server, mainframe, desktop computer, laptop computer, hand held computer, tablet computer, personal digital assistant (PDA), telephony device, cell phone, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The use of variable references, such as "a", "n", etc., to denote a number of instances of an item may refer to any integer number of instances of the item, where different variables may comprise the same number or different numbers. Further, a same variable reference used with different elements may denote a same or different number of instances of those elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A non-transitory computer readable storage medium including a computer program executed by at least one processor to perform operations in an online document sharing community in a network environment including a plurality of participant computers operated by participants in the online document sharing community and a storage system, the operations comprising:

receiving a search request from a requesting participant at a requesting participant computer comprising one of the participant computers in the network environment for a result page for documents satisfying a search criteria;

using, by a search engine, a search index to identify documents satisfying the search criteria, wherein the search index provides an index of terms in documents in a document store accessible through a database implementing the online document sharing community;

returning the result page to the requesting participant computer identifying at least one document in the document store identified by the search engine from the search index as satisfying the search criteria;

receiving a document request from the requesting participant for a requested document comprising one of the documents identified in the result page;

determining whether the requesting participant is a member of a group, indicated in group information in the database, associated with the requested document through information in the database;

in response to determining that the requesting participant is not a member of the group associated with the requested document, performing:

returning an access page to the requesting participant computer, including a non-disclosure agreement (NDA) requesting that the requesting participant accept terms of the NDA in order to access content of the requested document in the storage system;

returning the content of the requested document to the requesting participant computer in response to receiving indication from the requesting participant computer accepting the terms of the NDA; and adding the requesting participant as a member of the group in the group information in the database associated with the requested document to provide the requesting participant access to the content of the requested document in response to receiving indication that the requesting participant computer accepted the terms of the NDA.

2. The non-transitory computer readable storage medium of claim 1, wherein the operations further comprise:

generating document information in the database identifying documents in the storage system and owners of the documents, wherein at least one of the documents includes content comprising subject matter protected by intellectual property laws; and processing the documents to add search terms for the documents and document identifiers to the search index accessible through the network environment to participants in the online document sharing community not under an obligation of confidentiality to the owners of the documents with respect to the documents.

3. The non-transitory computer readable storage medium of claim 1, wherein the operations further comprise:

returning to the requesting participant computer a contact page enabling the requesting participant computer to send a message to an owner of the requested document in response to the document request;

forwarding the message to the owner enabling the owner to provide access to the requested document to the requesting participant; and receiving an authorization message from the owner indicating to offer access to the requested document to the requesting participant upon acceptance of the NDA by the requesting participant computer, wherein the access page including the NDA is returned to the requesting participant computer in response to receiving the authorization message from the owner.

4. The non-transitory computer readable storage medium of claim 3, wherein the message forwarded to the owner enables the owner to indicate to provide access to the requested document with an NDA and indicate to provide access to the requested document to the requesting participant without the NDA, wherein the authorization message comprises a first authorization message, and wherein the operations further comprise:

receiving a second authorization message from the owner indicating to offer access to the requested document to the requesting participant without requiring acceptance of the terms of the NDA; and providing the requesting participant access to the requested document without requiring acceptance of the terms of the NDA in response to the second authorization message.

5. The non-transitory computer readable storage medium of claim 1, wherein the operations further comprise:

maintaining in the database participant information for a plurality of participants registered in the database as participants in the online document sharing community, wherein the participant information for at least one of the participants is associated with document information for at least one document owned by the at least one participant, wherein the database includes participant information for the requesting participant requesting the requested document; and indicating in the document information the requesting participant accepting the NDA and a time the NDA was accepted.

6. The non-transitory computer readable storage medium of claim 5 wherein the operations further comprise:

indicating, in the document information, information on the requesting participant declining to accept the NDA to access the content of the requested document and a time the NDA was declined.

7. The non-transitory computer readable storage medium of claim 5, wherein the operations further comprise:

forwarding an owner NDA decline message to an owner of the requested document indicating that the requesting participant declined to accept the NDA for the requested document.

8. The non-transitory computer readable storage medium of claim 7, wherein the operations further comprise:

including in the owner NDA decline message a follow-up graphical element enabling the owner of the requested document to send a decline follow-up message to the requesting participant that declined to accept the NDA.

9. The non-transitory computer readable storage medium of claim 8, wherein the owner NDA decline message includes identification information for the requesting participant that declined to accept the NDA, wherein the follow-up graphical element in the owner NDA decline message enables the owner to include in the follow-up message to the requesting participant a link to enable the requesting participant to access the content of the requested document without accepting the NDA.

10. The non-transitory computer readable storage medium of claim 5, wherein the operations further comprise:

indicating in the document information a number of times the NDA for the requested document was accepted; and indicating in the document information a number of times the NDA for the requested document was declined.

11. The non-transitory computer readable storage medium of claim 1, wherein the operations further comprise:

performing an authentication of the requesting participant indicating acceptance of the terms of the NDA to authenticate an identity of the requesting participant, wherein the content of the requested document is made available to the requesting participant accepting the terms of the NDA in response to authenticating the identity of the requesting participant.

12. A system for implementing an online document sharing community in a network environment including a plurality of participant computers operated by participants in the online document sharing community and a storage system, comprising:

a processor: and a computer readable storage device including code executed by the processor to perform operations, the operations comprising:

receiving a search request from a requesting participant at a requesting participant computer comprising one of the participant computers in the network environment for a result page for documents satisfying a search criteria;

using, by a search engine, a search index to identify documents satisfying the search criteria, wherein the search index provides an index of terms in documents in a document store accessible through a database implementing the online document sharing community;

returning the result page to the requesting participant computer identifying at least one document in the document store identified by the search engine from the search index as satisfying the search criteria;

receiving a document request from the requesting participant for a requested document comprising one of the documents identified in the result page;

determining whether the requesting participant is a member of a group, indicated in group information in the database, associated with the requested document through information in the database;

in response to determining that the requesting participant is not a member of the group associated with the requested document, performing:

returning an access page to the requesting participant computer, including a non-disclosure agreement (NDA) requesting that the requesting participant accept terms of the NDA in order to access content of the document in the storage system;

returning the content of the requested document to the requesting participant computer in response to receiving indication from the requesting participant computer accepting the terms of the NDA; and adding the requesting participant as a member of the group in the group information in the database associated with the requested document to provide the requesting participant access to the content of the requested document in response to receiving indication that the requesting participant computer accepted the terms of the NDA.

13. The system of claim 12, wherein the operations further comprise:

returning to the requesting participant computer a contact page enabling the requesting participant computer to send a message to an owner of the requested document in response to the document request;

forwarding the message to the owner enabling the owner to provide access to the requested document to the requesting participant; and receiving an authorization message from the owner indicating to offer access to the requested document to the requesting participant upon acceptance of the NDA by the requesting participant computer, wherein the access page including the NDA is returned to the requesting participant computer in response to receiving the authorization message from the owner.

14. The system of claim 12, wherein the operations further comprise:

maintaining in the database participant information for a plurality of participants registered in the database as participants in the online document sharing community, wherein the participant information for at least one of the participants is associated with document information for at least one document owned by the at least one participant, wherein the database includes participant information for the requesting participant requesting the requested document; and indicating in the document information the requesting participant accepting the NDA and a time the NDA was accepted.

15. The system of claim 14, wherein the operations further comprise:

forwarding an owner NDA decline message to an owner of the requested document indicating that the requesting participant declined to accept the NDA for the requested document.

16. The system of claim 14, wherein the operations further comprise:

indicating in the document information a number of times the NDA for the requested document was accepted; and indicating in the document information a number of times the NDA for the requested document was declined.

17. A method performed by a computing system including at least one processor for implementing an online document sharing community in a network environment including a plurality of participant computers operated by participants in the online document sharing community and a storage system, comprising:

receiving, by the computing system, a search request from a requesting participant at a requesting participant computer comprising one of the participant computers in the network environment for a result page for documents satisfying a search criteria;

using, by a search engine, a search index to identify documents satisfying the search criteria, wherein the search index provides an index of terms in documents in a document store accessible through a database implementing the online document sharing community;

returning, by the computing system, the result page to the requesting participant computer identifying at least one document in the document store identified by the search engine from the search index as satisfying the search criteria;

receiving, by the computing system, a document request from the requesting participant for a requested document comprising one of the documents identified in the result page;

determining whether the requesting participant is a member of a group, indicated in group information in the database, associated with the requested document through information in the database;

in response to determining that the requesting participant is not a member of the group associated with the requested document, performing:

returning an access page to the requesting participant computer, including a non-disclosure agreement (NDA) requesting that the requesting participant accept terms of the NDA in order to access content of the document in the storage system;

returning by the computing system, the content of the requested document to the requesting participant computer in response to receiving indication from the requesting participant computer accepting the terms of the NDA; and adding the requesting participant as a member of the group in the group information in the database associated with the requested document to provide the requesting participant access to the content of the requested document in response to receiving indication that the requesting participant computer accepted the terms of the NDA.

18. The method of claim 17, further comprising:
returning to the requesting participant computer a contact page enabling the requesting participant computer to send a message to an owner of the requested document in response to the document request;
forwarding the message to the owner enabling the owner to provide access to the requested document to the requesting participant; and
receiving an authorization message from the owner indicating to offer access to the requested document to the requesting participant upon acceptance of the NDA by the requesting participant computer, wherein the access page including the NDA is returned to the requesting participant computer in response to receiving the authorization message from the owner.

19. The method of claim 17, further comprising:
maintaining in the database participant information for a plurality of participants registered in the database as participants in the online document sharing community, wherein the participant information for at least one of the participants is associated with document information for at least one document owned by the at least one participant, wherein the database includes participant information for the requesting participant requesting the requested document; and
indicating in the document information the requesting participant accepting the NDA and a time the NDA was accepted.

20. The method of claim 19, further comprising:
indicating in the document information a number of times the NDA for the requested document was accepted; and
indicating in the document information a number of times the NDA for the requested document was declined.

\* \* \* \* \*